US008849355B2

(12) United States Patent
Choi

(10) Patent No.: US 8,849,355 B2
(45) Date of Patent: Sep. 30, 2014

(54) MOBILE TERMINAL CAPABLE OF PROVIDING MULTIPLAYER GAME AND METHOD OF CONTROLLING OPERATION OF THE MOBILE TERMINAL

(75) Inventor: Kyungdong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 13/151,667

(22) Filed: Jun. 2, 2011

(65) Prior Publication Data

US 2011/0300910 A1 Dec. 8, 2011

(30) Foreign Application Priority Data

Jun. 4, 2010 (KR) .................. 10-2010-0052942
Jul. 14, 2010 (KR) .................. 10-2010-0068123

(51) Int. Cl.
| | | |
|---|---|---|
| H04B 1/38 | (2006.01) | |
| G06F 3/0482 | (2013.01) | |
| G06F 3/0485 | (2013.01) | |
| G06F 3/0488 | (2013.01) | |

(52) U.S. Cl.
CPC .......... *G06F 3/04883* (2013.01); *G06F 3/0482* (2013.01); *G06F 3/0485* (2013.01); *G06F 2203/04808* (2013.01)
USPC ........................... 455/566; 345/172; 345/173

(58) Field of Classification Search
USPC ........ 455/556.1, 566; 345/169–174; 715/702, 715/788, 255
See application file for complete search history.

(56) References Cited

U.S. PATENT DOCUMENTS

| | | | |
|---|---|---|---|
| 7,934,156 B2* | 4/2011 | Forstall et al. ................ | 715/255 |
| 2007/0247435 A1* | 10/2007 | Benko et al. .................. | 345/173 |
| 2007/0262964 A1* | 11/2007 | Zotov et al. ................... | 345/173 |
| 2008/0165255 A1* | 7/2008 | Christie et al. ........... | 348/207.99 |
| 2008/0192125 A1* | 8/2008 | Kang et al. ................. | 348/222.1 |
| 2008/0316178 A1* | 12/2008 | Caliksan et al. .............. | 345/169 |
| 2009/0259965 A1* | 10/2009 | Davidson et al. ............. | 715/788 |
| 2009/0282332 A1* | 11/2009 | Porat ............................ | 715/702 |
| 2010/0004030 A1 | 1/2010 | Nam | |
| 2010/0020025 A1* | 1/2010 | Lemort et al. ................ | 345/173 |
| 2010/0020221 A1* | 1/2010 | Tupman et al. .......... | 348/333.01 |
| 2010/0020222 A1* | 1/2010 | Jones et al. .............. | 348/333.02 |
| 2010/0039399 A1 | 2/2010 | Kim | |
| 2010/0062803 A1* | 3/2010 | Yun et al. .................... | 455/556.1 |
| 2010/0079380 A1* | 4/2010 | Nurmi ........................... | 345/172 |
| 2010/0088641 A1* | 4/2010 | Choi ............................ | 715/828 |
| 2010/0090971 A1* | 4/2010 | Choi et al. .................... | 345/173 |
| 2010/0090977 A1* | 4/2010 | Shih et al. .................... | 345/174 |

(Continued)

FOREIGN PATENT DOCUMENTS

| | | |
|---|---|---|
| CN | 101458591 A | 6/2009 |
| CN | 101620505 A | 1/2010 |

(Continued)

*Primary Examiner* — Nathan Taylor
(74) *Attorney, Agent, or Firm* — Birch, Stewart, Kolasch & Birch, LLP

(57) ABSTRACT

A method of controlling a mobile terminal and which includes allowing, via a wireless communication of the mobile terminal, wireless communication with at least one other terminal; displaying, via a touch screen display unit of the mobile terminal, a display screen; receiving, via a controller of the mobile terminal, a first touch input on the display screen and a second touch input on the display screen while the first touch input is touching the display screen; and executing, via the controller, a preset function based on the received first and second touch inputs.

22 Claims, 27 Drawing Sheets

(56) References Cited

U.S. PATENT DOCUMENTS

| | | | |
|---|---|---|---|
| 2010/0123737 A1* | 5/2010 | Williamson et al. | 345/672 |
| 2010/0134425 A1* | 6/2010 | Storrusten | 345/173 |
| 2010/0265186 A1* | 10/2010 | Ryynanen | 345/173 |
| 2010/0268426 A1* | 10/2010 | Pathak et al. | 701/48 |
| 2010/0283743 A1* | 11/2010 | Coddington | 345/173 |
| 2010/0295582 A1* | 11/2010 | Gaulin et al. | 327/114 |
| 2010/0295802 A1* | 11/2010 | Lee | 345/173 |
| 2011/0058052 A1* | 3/2011 | Bolton et al. | 348/211.99 |
| 2011/0060986 A1* | 3/2011 | Yang | 715/702 |
| 2011/0164062 A1 | 7/2011 | Nakamura et al. | |

FOREIGN PATENT DOCUMENTS

| | | |
|---|---|---|
| CN | 101672648 A | 3/2010 |
| KR | 10-2006-0032793 A | 4/2006 |
| KR | 10-2009-0006454 A | 1/2009 |
| KR | 10-2010-0020818 A | 2/2010 |
| KR | 10-2010-0090876 A | 8/2010 |

* cited by examiner (a)  (b)

(a)          (b)

MOBILE TERMINAL CAPABLE OF PROVIDING MULTIPLAYER GAME AND METHOD OF CONTROLLING OPERATION OF THE MOBILE TERMINAL

CROSS-REFERENCE TO A RELATED APPLICATION

This application claims the priority benefit of Korean Patent Application Nos. 10-2010-0052942 and 10-2010-0068123, filed on Jun. 4, 2010 and Jul. 14, 2010, respectively, in the Korean Intellectual Property Office, the disclosures of which are incorporated herein by reference.

BACKGROUND OF THE INVENTION

1. Field of the Invention

The present invention relates to a mobile terminal and a method of controlling the operation of the mobile terminal, and more particularly, to a mobile terminal and a method of controlling the operation of the mobile terminal, in which various operations performed by the mobile terminal can be effectively controlled in response to a multi-touch input.

2. Description of the Related Art

Mobile terminals are portable devices, which can provide users with various services such as a voice calling service, a video calling service, an information input/output service, and a data storage service. As the types of services provided by mobile terminals diversify, an increasing number of mobile terminals have been equipped with various complicated functions such as capturing photos or moving pictures, playing music files or moving image files, providing game programs, receiving broadcast programs and providing wireless interne services and have thus evolved into multimedia players.

Various attempts have been made to realize such complicated functions using hardware devices or software programs. For example, various user interface (UI) environments, in which users are allowed to easily search for and choose desired functions, have been developed. In addition, the demand for various designs for mobile terminals such as a double-sided liquid crystal display (LCD) or a full touch screen has steadily grown due to a growing tendency of considering mobile terminals as personal items that can represent personal individuality.

However, there is a restriction in allocating sufficient space for the installation of UIs such as a display or a keypad without compromising the mobility and the portability of mobile terminals. Therefore, it is beneficial to develop ways to control the operation of mobile terminals using a novel data input method and thus allowing the user to use various complicated functions of mobile terminals with convenience.

SUMMARY OF THE INVENTION

The present invention provides a mobile terminal and a method of controlling the operation of the mobile terminal, in which various operations performed by the mobile terminal can be effectively controlled in response to a multi-touch input.

In one general aspect, there is provided a method for controlling operation of a mobile terminal, the method including: displaying a list screen including a list of a plurality of items on a display module; in response to a multi-site multi-touch input, which includes first and second touch inputs detected from first and second regions, respectively, on the list screen, being detected from the list screen, entering a multi-selection mode for selecting more than one item from the list screen; and in response to a touch input being detected from the list screen, selecting one of the plurality of items designated by the touch input.

In another general aspect, there is provided a method of controlling the operation of a mobile terminal, the method including: displaying a list screen including a first list of a plurality of items on a display module; and in response to first and second touch inputs being detected from first and second regions, respectively, on the list screen, dividing the list screen into first and second sub-screens, displaying the first list on the first sub-screen and displaying a second list on the second sub-screen, wherein the first and second touch inputs designate first and second items, respectively, in the first list.

In another general aspect, there is provided a method of controlling the operation of a mobile terminal, the method including: displaying an idle screen on a display module; and in response to a multi-site multi-touch input, which includes first and second touch inputs detected from first and second regions, respectively, on the idle screen, being detected from the idle screen, displaying a first menu screen on the display module.

In another general aspect, there is provided a method of controlling the operation of a mobile terminal, the method including: displaying a preview screen provided by a camera on a display module; and in response to a multi-touch input, which includes first and second touch inputs, being detected from the preview screen, capturing an image using the camera.

In another general aspect, there is provided a method of controlling the operation of a mobile terminal, the method including: displaying a preview screen provided by a camera on a display module; and in response to a multi-site multi-touch input, which includes first and second touch inputs detected from first and second regions, respectively, on the preview screen, being detected from the preview screen, switching an operating mode of the camera to a video recording mode and record a video using the camera.

In another general aspect, there is provided a method of controlling the operation of a mobile terminal, the method including: displaying a document editor screen for writing and/or editing an electronic document on a display module; and in response to a multi-touch input, which includes first and second touch inputs, being detected from the document editor screen, dividing the document editor screen into first and second sub-screens, displaying the original document editor screen on the first sub-screen, and displaying a display screen including one or more file items on the second sub-screen.

In another general aspect, there is provided a method of controlling the operation of a mobile terminal, the method including: dividing a display area on a display module into first and second sections, displaying a first operation screen on the first section, and displaying a second operation screen on the second section; and in response to a multi-touch input, which includes first and second touch inputs, being detected from a border between the first and second sections and one of the first and second touch inputs being followed by a drag input, changing sizes of the first and second sections according to a direction corresponding to the drag input.

In another general aspect, there is provided a method of controlling the operation of a mobile terminal, the method including: displaying a first screen on a display module; and in response to a multi-touch input, which includes first and second touch inputs, being detected from the first screen and one of the first and second touch inputs being followed by a drag input, reducing a size of the first screen by as much as a distance corresponding to the drag input and displaying a second screen on a portion of the display module where the first screen is not displayed.

In another general aspect, there is provided a method of controlling the operation of a mobile terminal, the method including: displaying an operation screen relevant to a multimedia item being played in a background on a display module; and in response to a multi-touch input, which includes first and second touch inputs, being detected from the operation screen and one of the first and second touch inputs being followed by a drag input, performing a predefined multimedia playback control operation on the multimedia item according to a direction corresponding to the drag input.

In another general aspect, there is provided a method of controlling the operation of a mobile terminal, the method including: displaying a list screen including a first list of a plurality of text messages on a display module; and in response to a multi-touch input, which includes first and second touch inputs designating a first text message in the first list, being detected from the list screen, dividing the list screen into first and second sub-screens, displaying the first list on the first sub-screen, and displaying a display screen showing one or more additional functions that can be performed on the first text message on the second sub-screen.

In another general aspect, there is provided a mobile terminal, including: a display module configured to display a list screen including a list of a plurality of items; and a controller configured to, in response to a multi-site multi-touch input, which includes first and second touch inputs detected from first and second regions, respectively, on the list screen, being detected from the list screen and a touch input being followed by the multi-site multi-touch input, select one of the plurality of items designated by the touch input.

In another general aspect, there is provided a mobile terminal, including: a display module configured to display a list screen including a first list of a plurality of items; and a controller configured to, in response to first and second touch inputs being detected from first and second regions, respectively, on the list screen, divide the list screen into first and second sub-screens, display the first list on the first sub-screen and display a second list on the second sub-screen, wherein the first and second touch inputs designate first and second items, respectively, in the first list.

In another general aspect, there is provided a mobile terminal, including: a display module configured to display an idle screen; and a controller configured to, in response to a multi-site multi-touch input, which includes first and second touch inputs detected from first and second regions, respectively, on the idle screen, being detected from the idle screen, display a first menu screen on the display module.

In another general aspect, there is provided a mobile terminal, including: a camera; a display module configured to display a preview screen provided by the camera; and a controller configured to, in response to a multi-touch input, which includes first and second touch inputs, being detected from the preview screen, capture an image using the camera.

In another general aspect, there is provided a mobile terminal, including: a camera; a display module configured to display a preview screen provided by the camera; and a controller configured to, in response to a multi-site multi-touch input, which includes first and second touch inputs detected from first and second regions, respectively, on the preview screen, being detected from the preview screen, switch an operating mode of the camera to a video recording mode and record a video using the camera.

In another general aspect, there is provided a mobile terminal, including: a display module configured to display a document editor screen for writing and/or editing an electronic document; and a controller configured to, in response to a multi-touch input, which includes first and second touch inputs, being detected from the document editor screen, divide the document editor screen into first and second sub-screens, display the original document editor screen on the first sub-screen, and display a display screen including one or more file items on the second sub-screen.

In another general aspect, there is provided a mobile terminal, including: a display module configured to have a display area divided into first and second sections, display a first operation screen on the first section, and display a second operation screen on the second section; and a controller configured to, in response to a multi-touch input, which includes first and second touch inputs, being detected from a border between the first and second sections and one of the first and second touch inputs being followed by a drag input, change sizes of the first and second sections according to a direction corresponding to the drag input.

In another general aspect, there is provided a mobile terminal, including: a display module configured to display a first screen; and a controller configured to, in response to a multi-touch input, which includes first and second touch inputs, being detected from the first screen and one of the first and second touch inputs being followed by a drag input, reduce a size of the first screen by as much as a distance corresponding to the drag input and display a second screen on a portion of the display module where the first screen is not displayed.

In another general aspect, there is provided a mobile terminal, including: a display module configured to display an operation screen relevant to a multimedia item being played in a background; and a controller configured to, in response to a multi-touch input, which includes first and second touch inputs, being detected from the operation screen and one of the first and second touch inputs being followed by a drag input, perform a predefined multimedia playback control operation on the multimedia item according to a direction corresponding to the drag input.

In another general aspect, there is provided a mobile terminal, including: a display module configured to display a list screen including a first list of a plurality of text messages; and a controller configured to, in response to a multi-touch input, which includes first and second touch inputs designating a first text message in the first list, being detected from the list screen, divide the list screen into first and second sub-screens, display the first list on the first sub-screen, and display a display screen showing one or more additional functions that can be performed on the first text message on the second sub-screen.

In another general aspect, there is provided a computer-readable recording medium having recorded thereon a program for executing any one of the above-mentioned methods in a processor.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which embodiments of the invention are shown.

The term 'mobile terminal', as used herein, indicates, but is not restricted to, a mobile phone, a smart phone, a laptop computer, a digital broadcast receiver, a personal digital assistant (PDA), a portable multimedia player (PMP), a navigation device, a tablet computer or an electronic-book (e-book) reader. In this disclosure, the terms 'module' and 'unit' can be used interchangeably.

Figure 1:
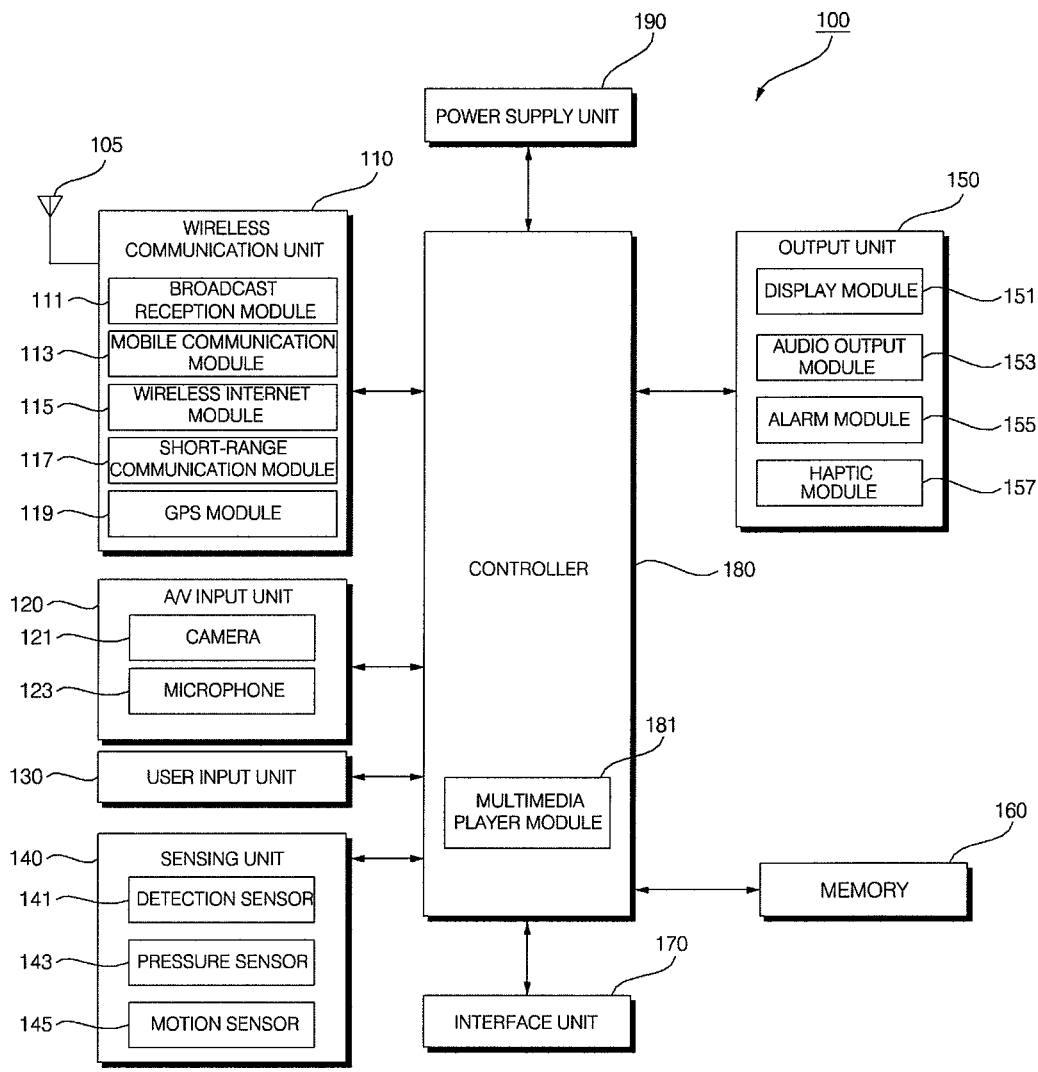
FIG. 1 illustrates a block diagram of a mobile terminal according to an embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Here, when the above constituent elements are implemented, two or more of the constituent elements may be combined into one constituent element, or one constituent element may be divided into two or more constituent elements, if appropriate.

The wireless communication unit 110 may include a broadcast reception module 111, a mobile communication module 113, a wireless internet module 115, a short-range communication module 117, and a global positioning system (GPS) module 119.

The broadcast reception module 111 may receive broadcast signals and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signals may include a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this instance, the broadcast-related information may be received by the mobile communication module 113, rather than by the broadcast reception module 111. The broadcast-related information may come in various forms. For example, the broadcast-related information may come in the form of digital multimedia broadcasting (DMB) electronic program guide (EPG) or digital video broadcasting-handheld (DVB-H) electronic service guide (ESG).

The broadcast reception module 111 may receive broadcast signals using various broadcasting systems, such as DMB-terrestrial (DMB-T), DMB-satellite (DMB-S), media forward link only (MediaFLO), DVB-H, and integrated services digital broadcast-terrestrial (ISDB-T). In addition, the broadcast reception module 111 may be suitable not only for the above-mentioned digital broadcasting systems but also for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera module 121 and a microphone 123. The camera module 121 may process various image frames such as still images or moving images acquired by an image sensor during a video call mode or an image capturing mode. The image frames processed by the camera module 121 may be displayed by a display module 151.

The image frames processed by the camera module 121 may be stored in the memory 160 or may be transmitted to an external device through the wireless communication unit 110. The mobile terminal 100 may include two or more cameras 121.

The microphone 123 may receive external audio signals during a call mode, a recording mode, or a voice recognition mode and may convert the received sound signals into electrical audio data. During the call mode, the mobile communication module 113 may convert the electrical sound data into data that can be readily transmitted to a mobile communication base station, and may then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 may determine a current state of the mobile terminal 100 such as whether the mobile terminal 100 is opened or closed, the position of the mobile terminal 100 and whether the mobile terminal 100 is placed in contact with the user, and may generate a sensing signal for controlling the operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may detect an approaching object or whether there is an object nearby the mobile terminal 100 without mechanical contact. More specifically, the detection sensor 141 may detect an approaching object based on a change in an alternating current (AC) magnetic field or a static magnetic field, or the rate of change of capacitance. The sensing unit 140 may include two or more detection sensors 141.

The pressure sensor 143 may determine whether pressure is being applied to the mobile terminal 100 or may measure the magnitude of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this instance, it is possible to differentiate a typical touch input from a pressure touch input, which is generated by applying greater pressure than that used to generate a typical touch input, based on a signal output by the pressure sensor 143. In addition, it is possible to determine the magnitude of pressure applied to the display module 151 upon receiving a pressure touch input based on the signal output by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, two or more acceleration sensors representing different axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a mutual layer structure and are thus implemented as a touch screen, the display module 151 may be used not only as an output device but also as an input device capable of receiving information by being touched by the user.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of an LCD, a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module and an internal display module.

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving an incoming call or message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a list of contacts, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 and 3. The present invention can be applied to nearly all types of mobile terminals such as a folder-type, a bar-type, a swing-type and a slider-type mobile terminal. However, for convenience, it is assumed that the mobile terminal 100 is a bar-type mobile terminal equipped with a full touch screen.

Figure 2:
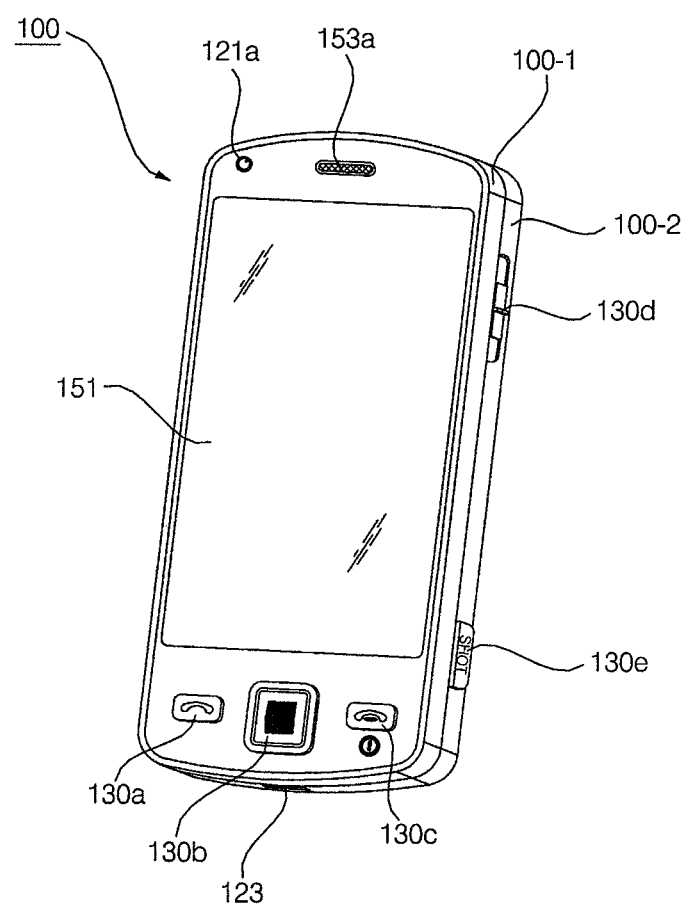
FIG. 2 illustrates a front perspective view of the mobile terminal shown in FIG. 1.

FIG. 2 illustrates a front perspective view of the mobile terminal 100. Referring to FIG. 2, the exterior of the mobile terminal 100 may be formed by a front case 100-1 and a rear case 100-2. Various electronic devices may be installed in the space formed by the front case 100-1 and the rear case 100-2. The front case 100-1 and the rear case 100-2 may be formed of a synthetic resin through injection molding. Alternatively, the front case 100-1 and the rear case 100-2 may be formed of a metal such as stainless steel (STS) or titanium (Ti).

The display module 151, a first audio output module 153a, a first camera 121a, and first through third user input modules 130a through 130c may be disposed in the main body of the mobile terminal 100, and particularly, in the front case 100-1. Fourth and fifth user input modules 130d and 130e and the microphone 123 may be disposed on one side of the rear case 100-2.

If a touch pad is configured to overlap the display module 151 and thus to form a mutual layer structure, the display module 151 may serve as a touch screen and may thus be able to allow the user to enter various information simply by touching the display module 151.

The first audio output module 153a may be implemented as a receiver or a speaker. The first camera 121a may be configured to be suitable for capturing a still or moving image of the user. The microphone 123 may be configured to properly receive the user's voice or other sounds.

The first through fifth user input modules 130a through 130e and sixth and seventh user input modules 130f and 130g may be collectively referred to as the user input unit 130. The user input unit 130 may adopt various tactile manners as long as it can offer tactile feedback to the user.

For example, the user input unit 130 may be implemented as a dome switch or touch pad capable of receiving a command or information by being pushed or touched by the user; or a wheel, a jog dial or wheel, or a joystick capable of receiving a command or information by being rotated. More specifically, the first through third user input modules 130a through 130c may be used to make or receive a call, move a mouse pointer, scroll a display screen, and enter various commands such as 'start', 'end', and 'scroll' to the mobile terminal 100, the fourth user input module 130d may be used to select an operation mode for the mobile terminal 100, and the fifth user input module 130e may serve as a hot key for activating certain functions of the mobile terminal 100.

Figure 3:
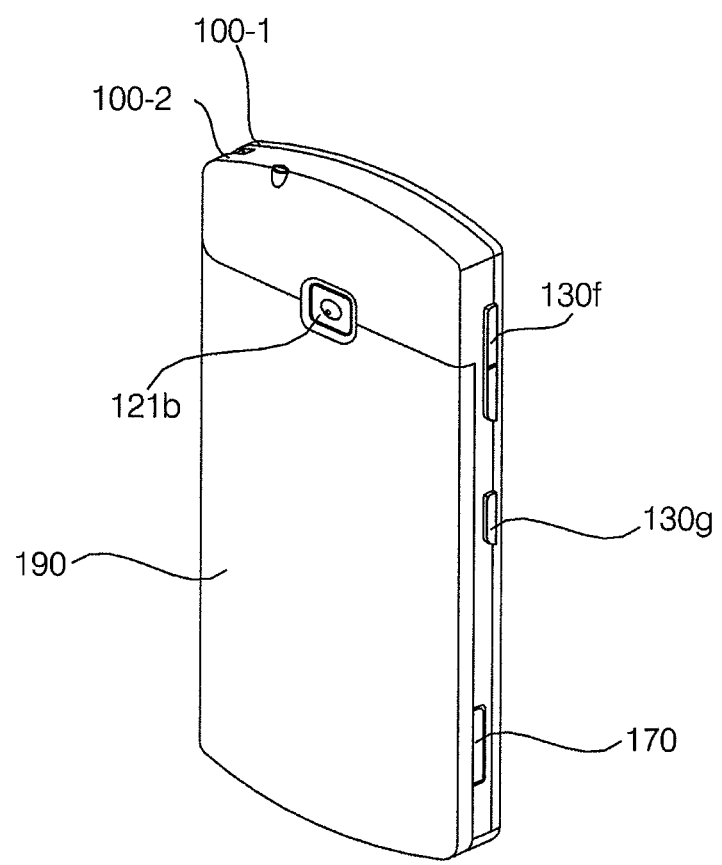
FIG. 3 illustrates a rear perspective view of the mobile terminal shown in FIG. 2.

FIG. 3 illustrates a rear perspective view of the mobile terminal 100. Referring to FIG. 3, a second camera 121b may be disposed at the rear of the rear case 100-2. The sixth and seventh user input modules 130f and 130e and the interface unit 170 may be disposed on one side of the second body 100B.

The second camera 121b may have a different photographing direction from the first camera 121a shown in FIG. 2. In addition, the first and second cameras 121a and 121b may have different resolutions.

A camera flash and a mirror may be disposed near the second camera 121b. The camera flash may be used to illuminate a subject when the user attempts to capture an image of the subject with the second camera 121b. The mirror may be used for the user to prepare himself or herself for taking a self shot.

A second audio output module may be additionally provided in the rear case 100-2. The second audio output module may realize a stereo function along with the first audio output module 153a. The second audio output module may also be used in a speaker-phone mode.

The interface unit 170 may serve as a pathway for allowing the mobile terminal 100 to exchange data with an external device.

Not only an antenna for making or receiving a call but also an antenna for receiving a broadcast signal may be disposed on one side of the rear case 100-2. The antennas may be installed so as to be able to be retracted from the rear case 100-2.

The power supply unit 190, which supplies power to the mobile terminal 100, may be disposed in the rear case 100-2. The power supply unit may be a rechargeable battery and may be coupled to the rear case 100-2 so as to be attachable to or detachable from the rear case 100-2.

The second camera 121b and the other elements that have been described as being provided in the rear case 100-2 may be provided in the front case 100-1. In addition, the first camera 121a may be configured to be rotatable and thus to cover the photographing direction of the second camera 121b. In this instance, the second camera 121b may be optional.

(Definitions of Basic Terms)

Figure 4:
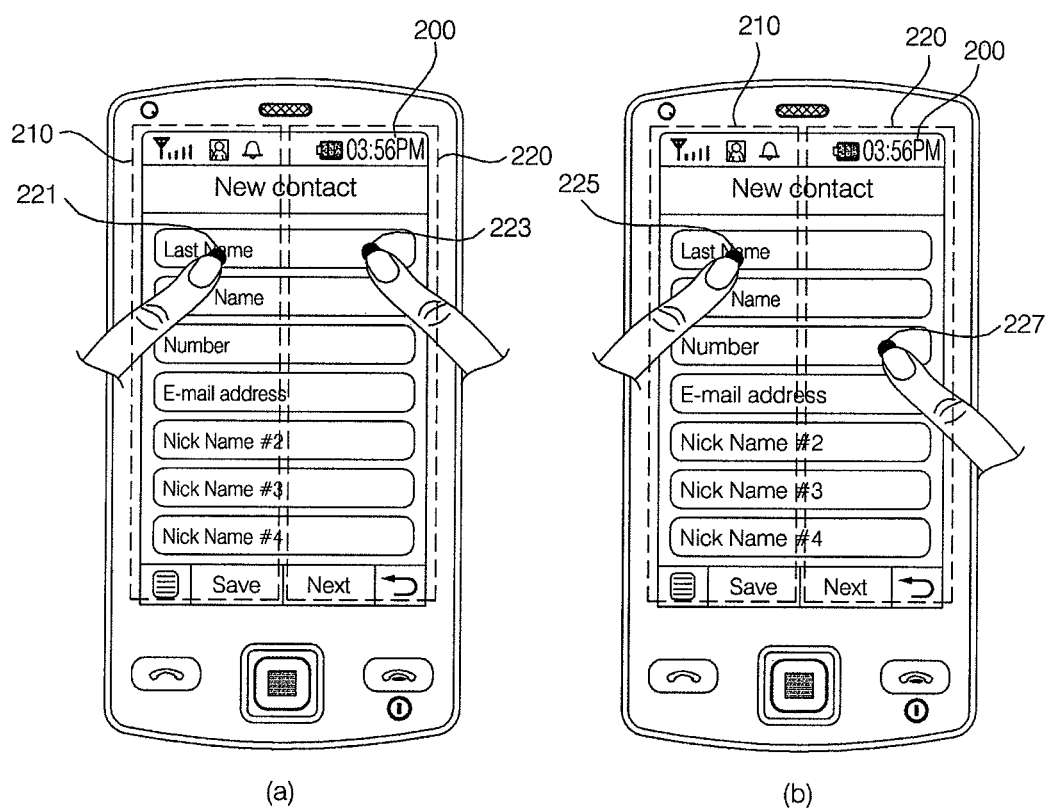
FIGS. 4 and 5 illustrate diagrams for explaining the terms used in the description of the present invention.
Figure 5:
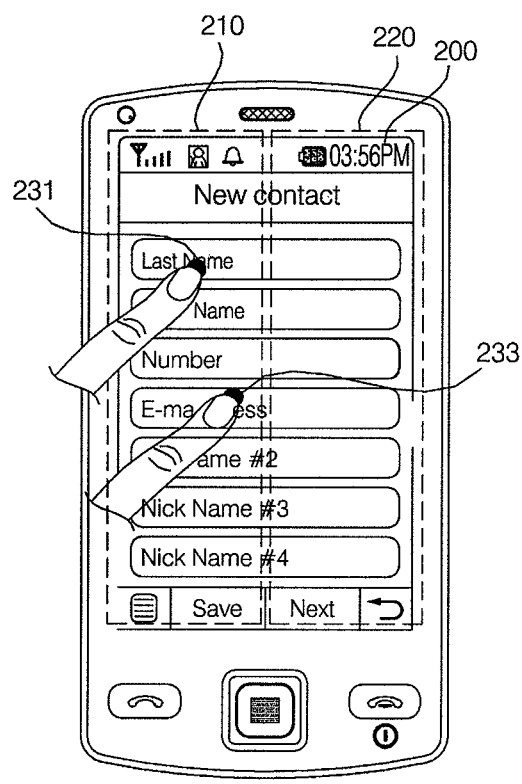

FIGS. 4 and 5 illustrate diagrams for explaining terms used in the description of the present invention. Referring to FIG. 4(a), an operation screen 200 may be vertically divided into two sub-screens: a first sub-screen 210 on the right side of the operation screen 200 and a second sub-screen 220 on the left side of the operation screen 200. The term 'a multi-site multi-touch input' indicates, but is not restricted to, a multi-touch input including first and second touch inputs 221 and 223 detected from the first and second sub-screens 210 and 220, respectively. The size of the first sub-screen 210 may or may not be the same as the size of the second sub-screen 220.

Referring to FIG. 4(b), even when first and second touch inputs 225 and 227 designate different items, the first and second touch inputs 225 and 227 may be classified as a multi-site multi-touch input as long as they are detected from different sub-screens of the operation screen 200.

On the other hand, referring to FIG. 5, a single-site multi-touch input may be defined as a multi-touch input including first and second touch inputs 231 and 233 detected both from the first sub-screen 210. In this regard, a multi-touch input including first and second touch inputs detected both from the second sub-screen 220 may also be classified as a single-site multi-touch input.

Alternatively to that shown in FIGS. 4 and 5, the operation screen 200 may be divided horizontally into two sub-screens: upper and lower sub-screens. In this instance, a multi-touch input including first and second touch inputs detected from the upper and lower sub-screens, respectively, may be classified as a multi-site multi-touch input, whereas a multi-touch input including first and second touch inputs detected from the upper or lower sub-screen may be classified as a single-site multi-touch input.

(Embodiments Related to List)

Figure 6:
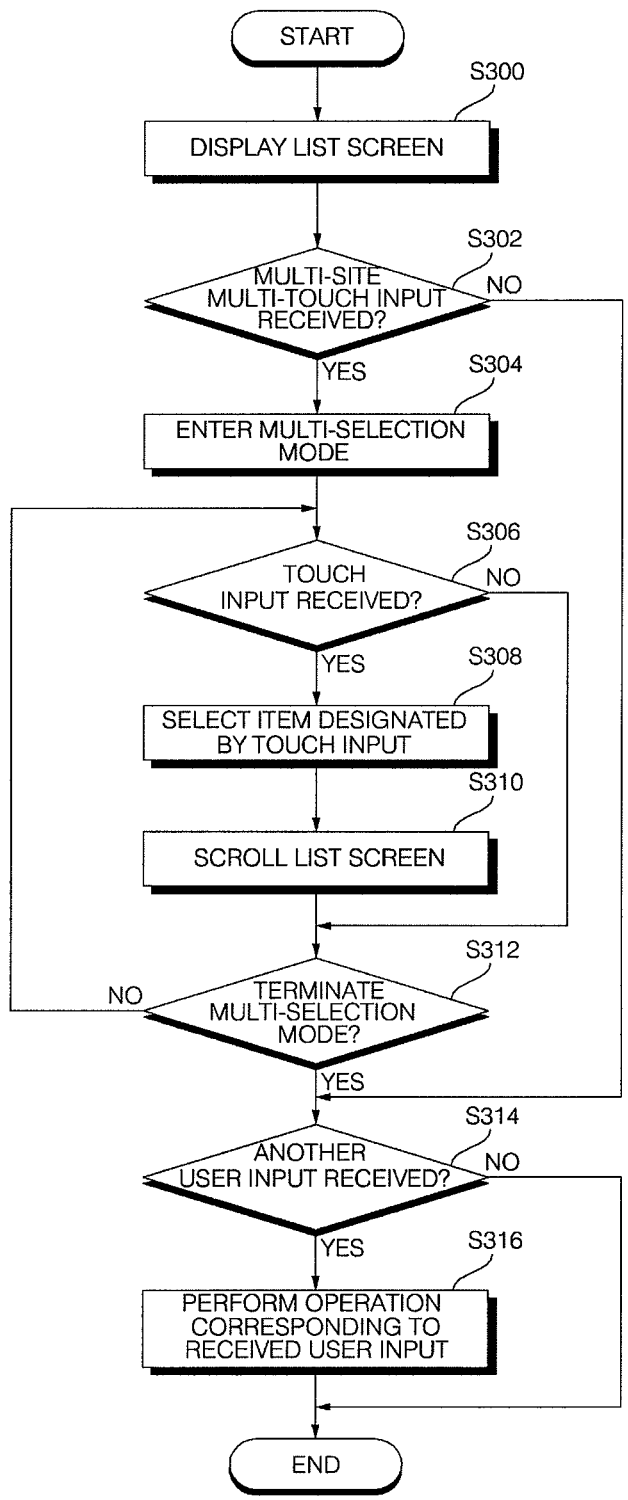
FIG. 6 illustrates a flowchart of a method of controlling the operation of a mobile terminal according to an embodiment of the present invention.

FIG. 6 illustrates a flowchart of a method of controlling the operation of a mobile terminal according to an embodiment of the present invention. Referring to FIG. 6, if a menu such as a phonebook menu, a mail inbox/outbox menu, an MP3 player menu, a video player menu or an image viewer menu is selected in response to, for example, a user command, the controller 180 may display a list screen showing a list of items relevant to the selected menu on the display module 151, which includes a touch screen (S300).

Thereafter, if a multi-site multi-touch input is detected from the list screen (S302), the controller 180 may control the mobile terminal 100 to enter a multi-selection mode for selecting more than one item from the list screen (S304). Thereafter, if a new touch input is detected (S306), the controller 180 may control an item designated by the new touch input to be selected (S308). If there is an item designated by the multi-site multi-touch input, the controller 180 may also control the item designated by the multi-site multi-touch input to be selected. Alternatively, the controller 180 may ignore the item designated by the multi-site multi-touch input and may only control the item selected by the new touch input following the multi-site multi-touch input.

The controller 180 may display a selected item differently from other non-selected items so as for the selected item to be easily distinguishable. The controller 180 may generate a haptic effect in response to the selection of an item.

Thereafter, the controller 180 may control the list screen to be scrolled in consideration of the location of the item selected by the new touch input (S310). As a result, a number of items that follow the item selected by the new touch input can be shown on the list screen. The amount by which the list screen is scrolled may be determined by a setting in the mobile terminal 100. More specifically, the list screen may be scrolled by an amount corresponding to the distance between a previous selected item and a current selected item. If a most recently selected item is displayed in the lower half of the list screen, the list screen may be scrolled by half a page. If the most recently selected item is displayed at the bottom of the list screen or if there is no further desired item on a current page of the list screen 400, the list screen may be scrolled by a page.

Operations 5306 through 5310 may be repeatedly performed until the user wishes to terminate the multi-selection mode (S312). The multi-selection mode may be terminated in response to another multi-site multi-touch input or a single-site multi-touch input or in response to the selection of a predetermined menu icon.

If another user input (such as a key input), other than a touch input, is detected (S314), the controller 180 may control an operation corresponding to the detected user input to be performed (S316). Examples of the operation corresponding to the detected user input include, but are not restricted to, deleting, copying, and moving a number of items selected during the multi-selection mode and other various functions that can be performed by the mobile terminal 100.

According to this embodiment, it is possible to enter a multi-selection mode for selecting more than one item from a list screen in response to a multi-touch input.

Figure 7:
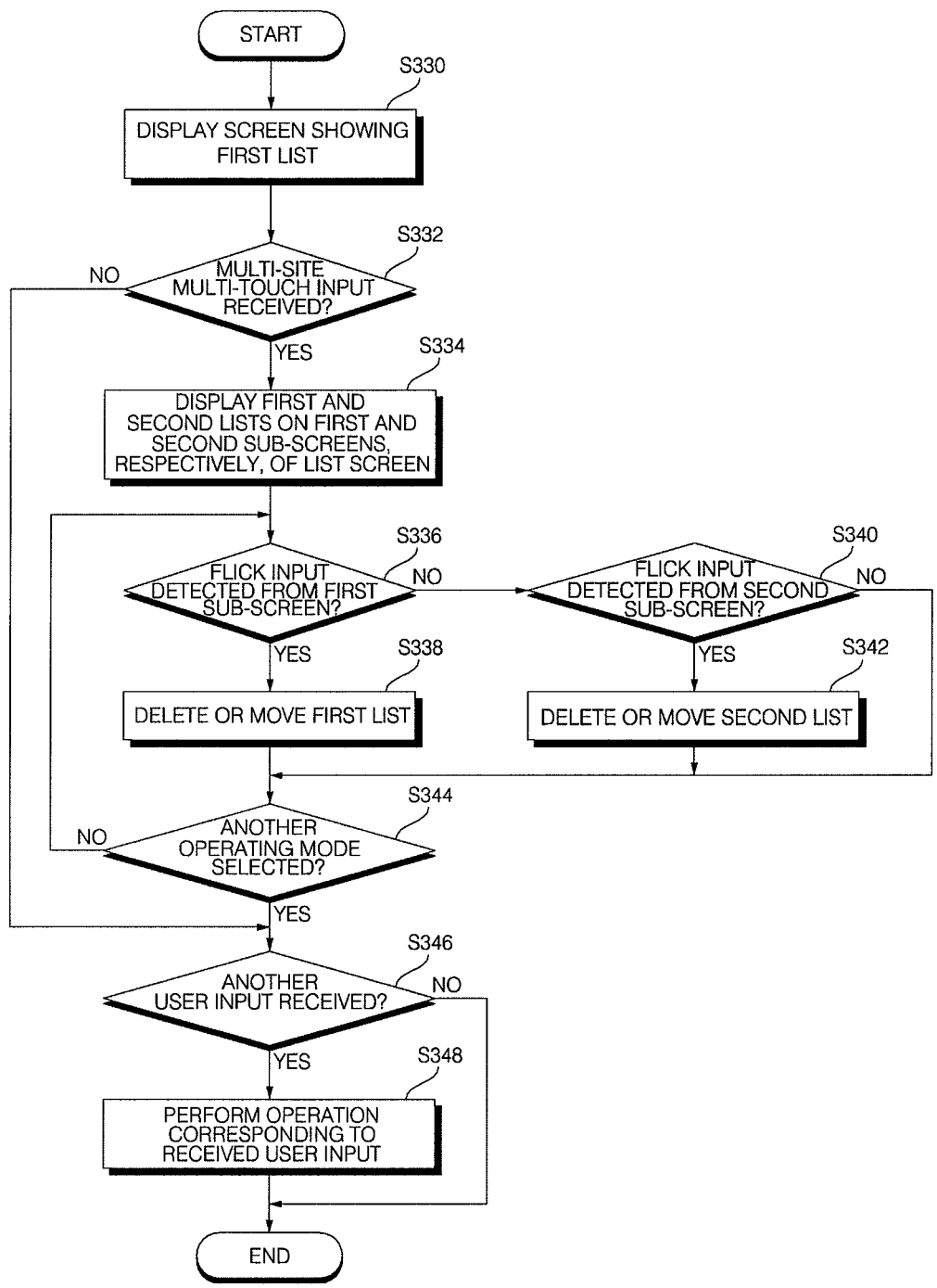
FIG. 7 illustrates a flowchart of a method of controlling the operation of a mobile terminal according to another embodiment of the present invention.

FIG. 7 illustrates a flowchart of a method of controlling the operation of a mobile terminal according to another embodiment of the present invention. Referring to FIG. 7, the controller 180 may display a list screen showing a first list including a plurality of items that are relevant to a current operation mode selected in response to, for example, a user command, on the display module 151, which includes a touch screen (S330).

Thereafter, if a multi-site multi-touch input is detected from the list screen (S332), the controller 180 may divide the list screen into first and second sub-screens and may display the first list on the first sub-screen and a second list, which is different from the first list, on the second sub-screen (S334).

Thereafter, if a flick input is detected from the first sub-screen (S336), the controller 180 may either delete or move the first list from the first sub-screen according to the direction of the flick input (S338). For example, if a flick to the left is detected from the first sub-screen, the controller 180 may delete the first list from the first sub-screen. On the other hand, if a flick to the right is detected from the first sub-screen, the controller 180 may move the first list from the first sub-screen to the second sub-screen.

The term 'flick input' indicates, but is not restricted to, a user input generated by scratching the surface of the display module 151 lightly with a finger. A flick input and a typical touch input can be distinguished from each other by the duration for which the user touches the surface of the display module 151 with a finger.

If a flick input is detected from the second sub-screen (S340), the controller 180 may either delete or move the second list from the second sub-screen according to the direction of the flick input (S342). For example, if a flick to the right is detected from the second sub-screen, the controller 180 may delete the second list from the second sub-screen. On the other hand, if a flick to the left is detected from the first sub-screen, the controller 180 may move the second list from the second sub-screen to the first sub-screen.

When the first or second list is deleted or moved in response to a flick input, a predetermined list may be displayed on the first or second sub-screen instead of the first or second list.

Operations 5336 through S342 may be repeatedly performed until the user chooses another operation mode, other than the current operation mode (S344).

If another user input, other than a touch input or a flick input, is detected (S346), the controller 180 may control an operation corresponding to the detected user input to be performed (S348).

According to this embodiment, it is possible to divide a list screen on the display module 151 into two or more sub-screens in response to a multi-touch input and then display different lists on the two or more sub-screens.

The embodiments of FIGS. 6 and 7 will hereinafter be described in further detail with reference to FIGS. 8 through 10.

Figure 8:
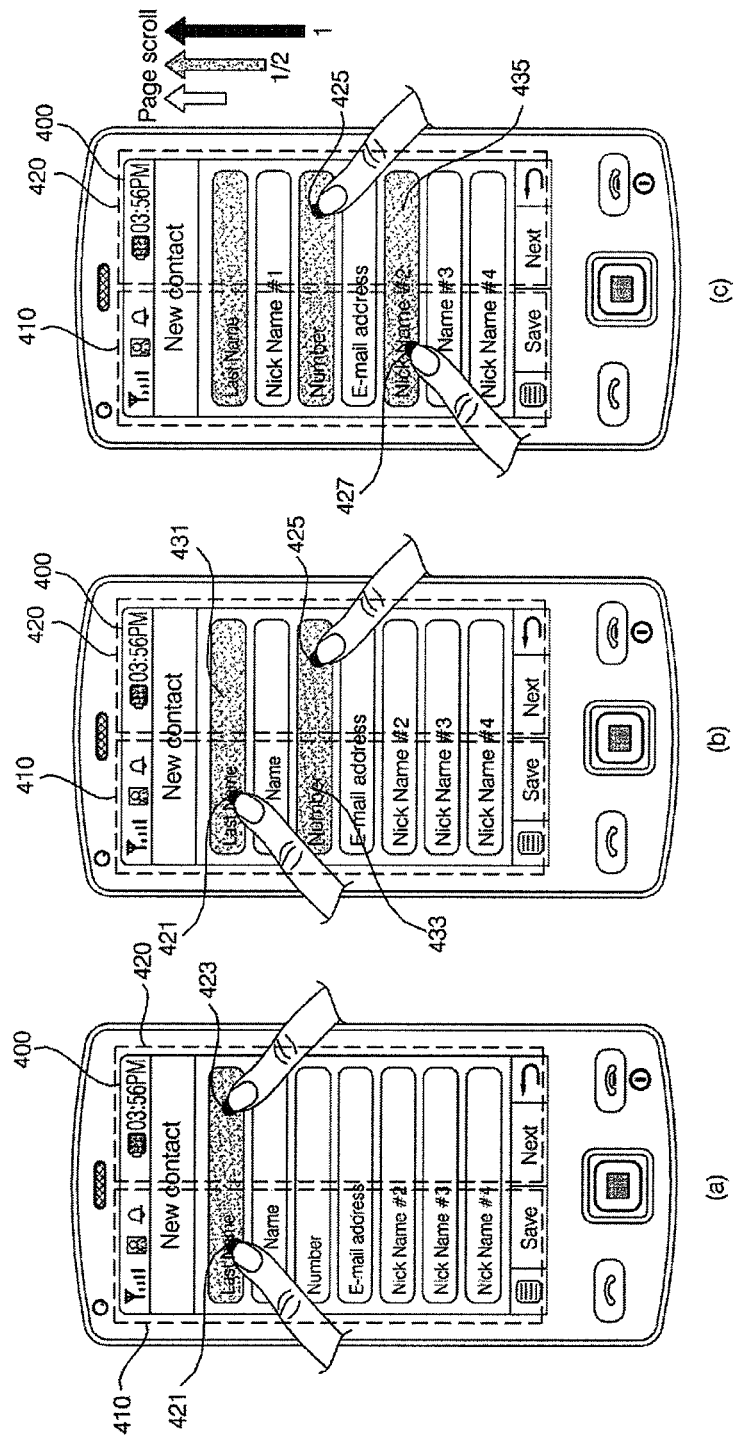
FIGS. 8 through 10 illustrate diagrams of various display screens for explaining the embodiments of FIGS. 6 and 7.

FIG. 8 illustrates how to enter a multi-selection mode in response to a multi-site multi-touch input. Referring to FIG. 8(a), a list screen 400 showing a list of items may be divided into first and second sub-screens 410 and 420. If a multi-touch input including a first touch input 421, which is detected from the first sub-screen 410 and a second touch input 423, which is detected from the second sub-screen 420, is detected from the list screen 400, the mobile terminal 100 may enter a multi-selection mode for selecting more than one item from the list screen 400. The first and second sub-screens 410 and 420 may or may not be marked clearly on the list screen 400.

Thereafter, referring to FIG. 8(b), if a touch input 425 is received, an item 433 designated by the touch input 425 may be selected. In this instance, an item 431 designated by the multi-touch input including the first touch input 421 and the second touch input 423 may also be selected.

Thereafter, referring to FIG. 8(c), if another touch input 427 is received, an item 435 designated by the touch input 427 may also be selected. In this manner, in the multi-selection mode, the user can easily select more than one item from the list screen 400 simply by touching on the display module 151.

Once one or more items are selected from a current page of the list screen 400, the list screen 400 may be automatically scrolled up or down so as to show other items not shown on the current page of the list screen 400. More specifically, the list screen 400 may be scrolled by an amount corresponding to the distance between a previous selected item and a current selected item. If a most recently selected item is displayed in the lower half of the list screen 400, the list screen 400 may be scrolled by half a page. If the most recently selected item is displayed at the bottom of the list screen 400 or if there is no further desired item on the current page of the list screen 400, the list screen 400 may be scrolled by a page.

The mobile terminal 100 may be configured to enter the multi-selection mode not only in response to a multi-touch input including two or more single touch inputs designating the same item but also in response to a multi-touch input including two or more single touch inputs designating different items.

Figure 9:
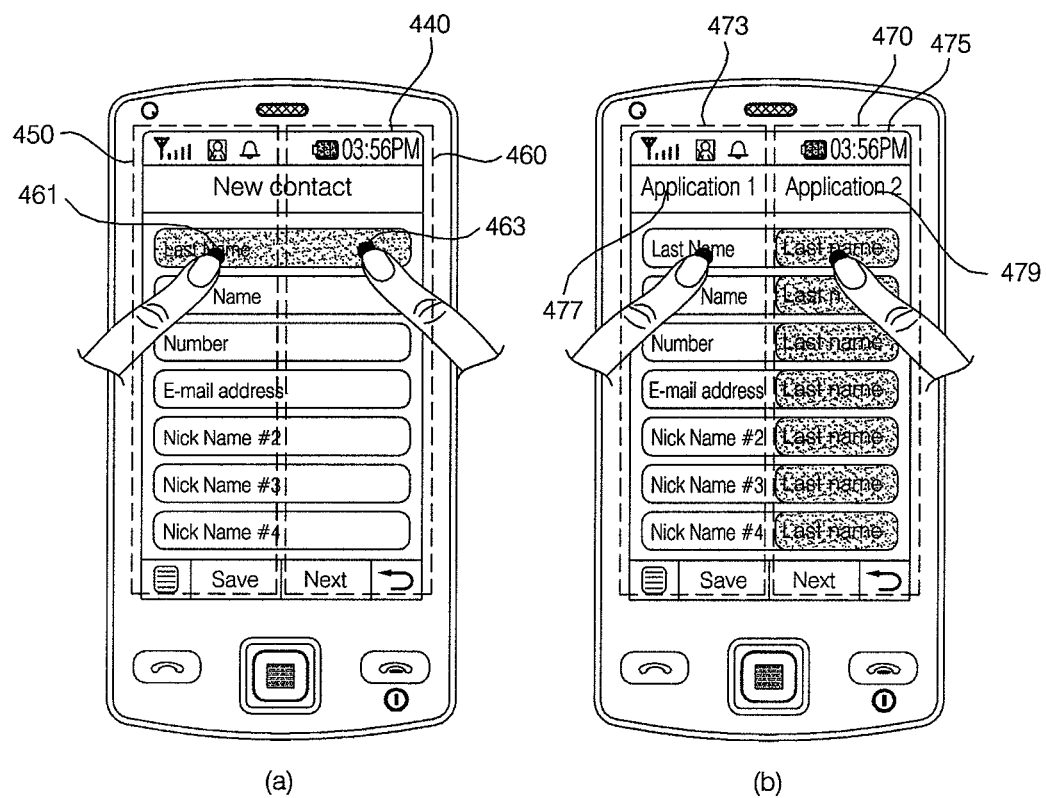

FIG. 9 illustrates how to display a plurality of lists at the same time in response to a multi-site multi-touch input. Referring to FIGS. 9(a) and 9(b), if a multi-site multi-touch input, which includes first and second touch inputs 461 and 463 detected from first and second sub-screens 450 and 460, respectively, of a list screen 440, is detected from the list screen 440, an operation screen 470 including a first display screen 473 showing the first list and a second display screen 475 showing a second list, which is different from the first list, may be displayed on the display module 151.

Thereafter, if a user input with directivity such as a flick or drag to the left is detected from the first display screen 473, the first list may be deleted from the first display screen 473. On the other hand, if a user input with directivity such as a flick or drag to the right is detected from the first display screen 473, the first list may be moved from the first display screen 473 to the second display screen 475.

Similarly, if a user input with directivity such as a flick or drag to the left is detected from the second display screen 475, the second list may be moved from the second display screen 475 to the first display screen 473. On the other hand, if a user input with directivity such as a flick or drag to the right is detected from the second display screen 475, the second list may be deleted from the second display screen 475, and a third list may be displayed on the second display screen 475.

The first and second lists may be any lists selected by the user. For example, the first and second lists may be contacts lists stored in different SIM cards. If titles 477 and 479 of the first and second lists are selected, all the items included in each of the first and second lists may be selected.

Figure 10:
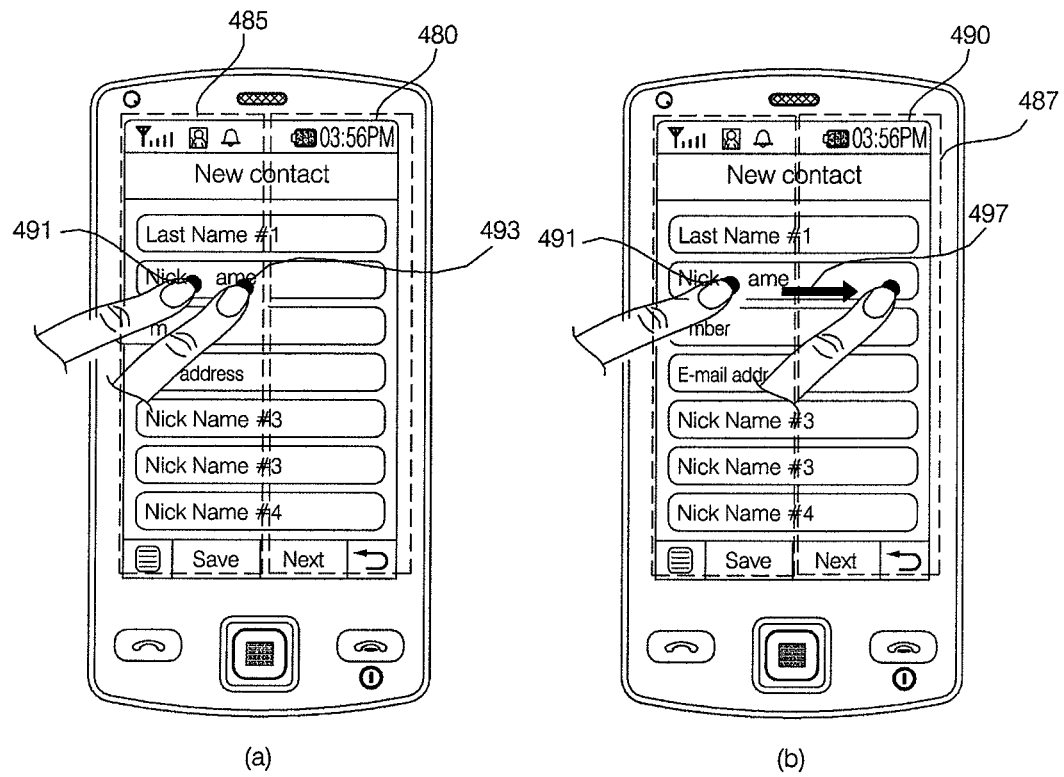

FIG. 10 illustrates diagrams for explaining various operations that can be performed by the mobile terminal 100 in response to a single-site multi-touch input. Referring to FIGS. 10(a) and 10(b), if a single-site multi-touch input, which includes first and second touch inputs 491 and 493 detected both from a first sub-screen 485 of a list screen 480, and then a drag to the second sub-screen 487 are detected in a row from the list screen 480, various operations may be performed such as deleting an item designated by the single-site multi-touch input or moving the item from one folder to another folder. A single-site multi-touch input may be used to zoom in or out an image displayed on, for example, an image viewer screen.

(Embodiments Related to Idle Screen and Menu)

Figure 11:
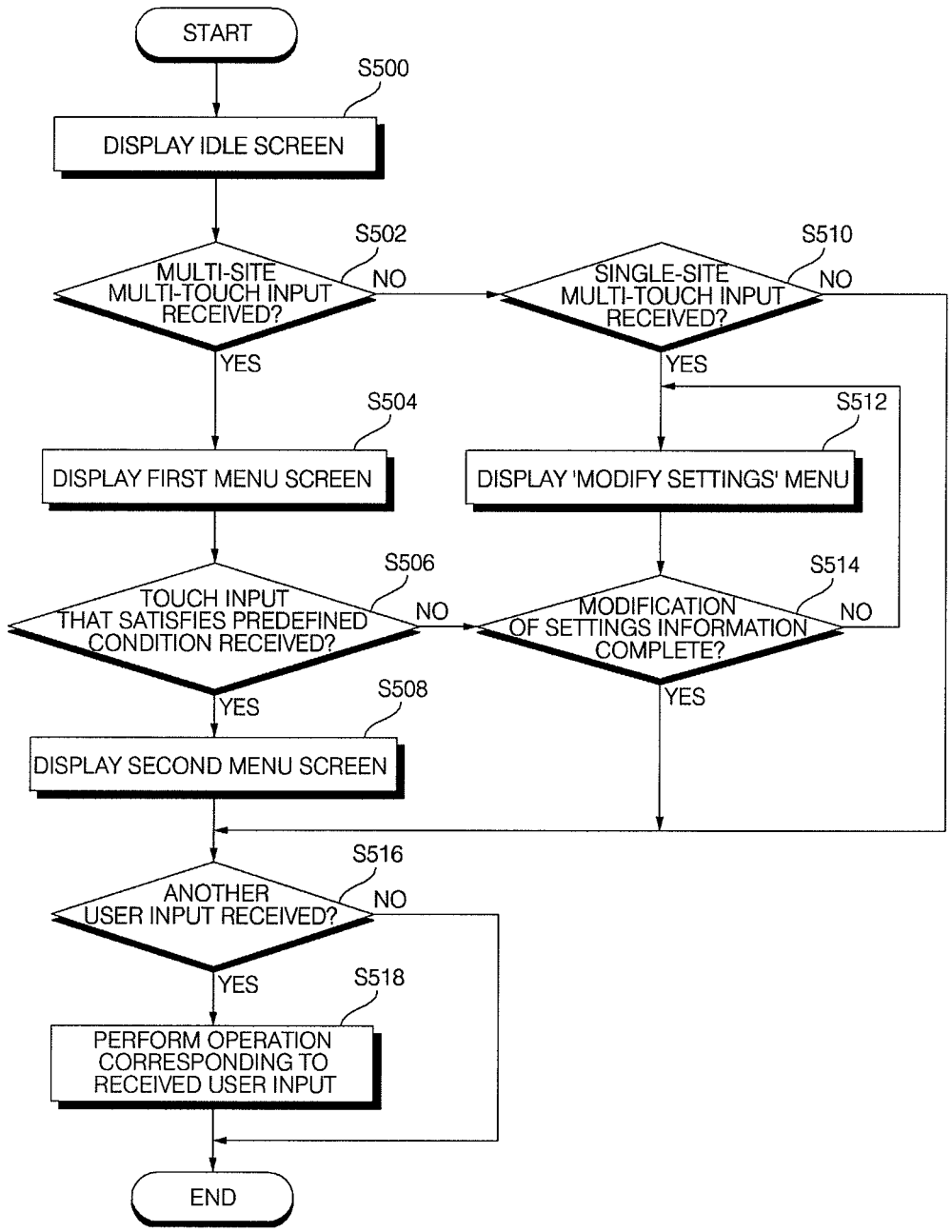
FIG. 11 illustrates a flowchart of a method of controlling the operation of a mobile terminal according to another embodiment of the present invention.

FIG. 11 illustrates a flowchart of a method of controlling the operation of a mobile terminal according to another embodiment of the present invention. Referring to FIG. 11, the controller 180 may display an idle screen on the display module 151 after the mobile terminal 100 is booted up or released from a lock mode or if no user input is detected for more than a predefined amount of time (S500).

Thereafter, if a multi-site multi-touch input is detected from the display module 151 (S502), the controller 180 may display a first menu screen on the display module 151 (S504).

The user can select each menu icon displayed on the first menu and can thus perform a corresponding operation. If more than one menu icon is selected from the first menu screen, a number of operations respectively corresponding to the selected menu icons may be performed one after another, and a number of operation screens relevant to the performing of the operations may be displayed on the display module 151 or may be displayed as virtual screens.

Thereafter, if a touch input that satisfies a predefined condition is detected from the first menu screen (S506), the controller 180 may display a second menu screen on the display module 151 (S508). The predefined condition may be set regarding a touch duration or touch area.

The first and second menu screens may be selected by the user. For this, a menu for selecting what menu screens should be displayed as the first and second menu screens may be provided.

If a single-site multi-touch input is detected from the idle screen (S510), the controller 180 may display a 'Modify Settings' menu on the display module 151 (S512). Examples of settings information that can be modified using the 'Modify Settings' menu include, but are not restricted to, background settings information, control-related information, event-related information and other user settings information.

In order to modify the settings information, the user may enter a long touch input, which is a type of touch input that is detected for more than a predefined amount of time or has pressure higher than a predefined level.

The display of the 'Modify Settings' menu continues until the modification of the settings information is complete (S514). If a user input, other than a touch input, such as a key input, is detected (S516), the controller 180 may control an operation corresponding to the detected user input to be performed (S518).

According to this embodiment, it is possible to easily switch from an idle screen to a menu screen or a 'Modify Settings' menu screen in response to a multi-touch input.

The embodiment of FIG. 11 will hereinafter be described in further detail with reference to FIGS. 12 and 13.

Figure 12:
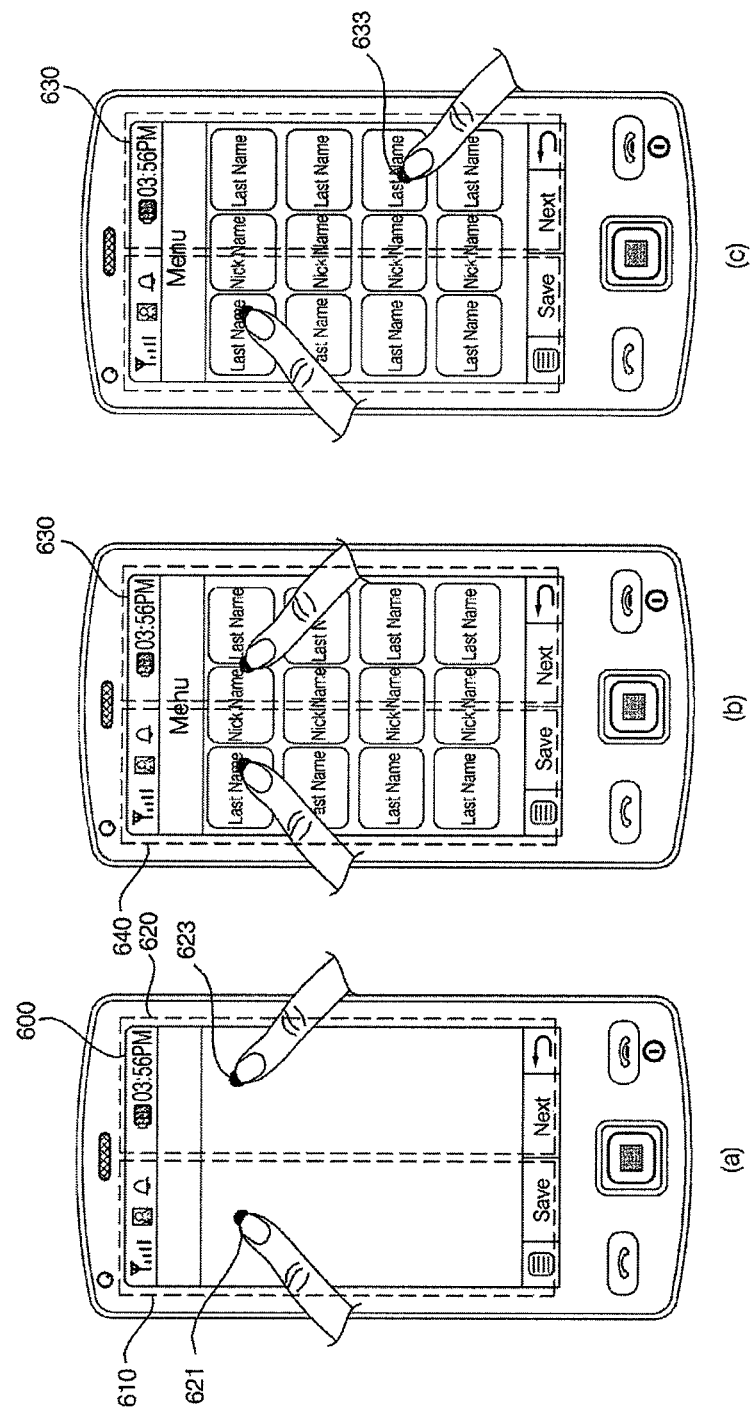
FIGS. 12 and 13 illustrate diagrams of various display screens for explaining the embodiment of FIG. 11.

FIG. 12 illustrates how to display a menu screen in response to a multi-site multi-touch input detected from an idle screen. Referring to FIGS. 12(a) and 12(b), if a multi-site multi-touch input, which includes first and second touch inputs 621 and 623 detected from first and second sub-screens 610 and 620, respectively, of an idle screen 600, is detected from the idle screen 600, a menu screen 630 may be displayed on the display module 151. The user can set what menu screen should be displayed in response to a multi-site multi-touch input.

Referring to FIG. 12(c), if a touch input 633 that satisfies a predefined condition is detected from the menu screen 630, another menu screen may be displayed on the display module 151. Each menu icon displayed on the menu screen 630 may be selected or executed by a typical touch input that does not satisfy the predefined condition.

Figure 13:
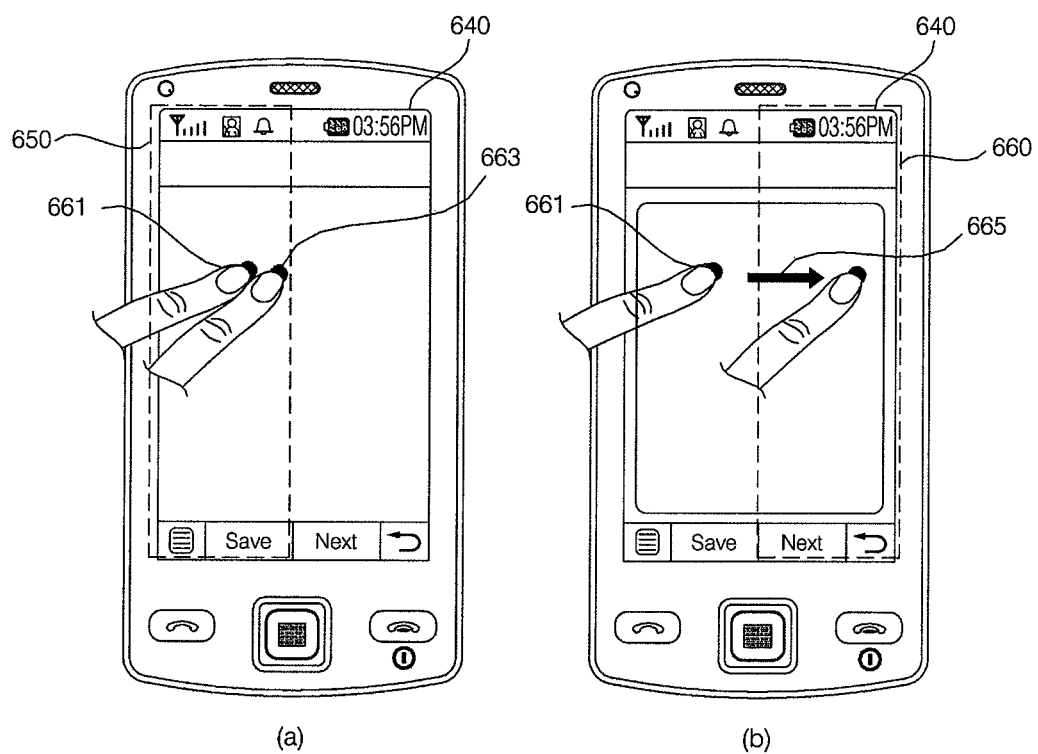

FIG. 13 illustrates diagrams for explaining various operations that can be performed by the mobile terminal 100 in response to a single-site multi-touch input detected from an idle screen. Referring to FIG. 13(a), if a single-site multi-touch input, which includes first and second touch inputs 661 and 663 detected both from a first sub-screen of an idle screen 640, is detected from the idle screen 640, a 'Modify Settings' menu may be displayed on the display module 151. Examples of settings information that can be modified using the 'Modify Settings' menu include, but are not restricted to, background settings information, control-related information, event-related information and other user settings information. Examples of the background settings information include, but are not restricted to, information regarding the enlargement or reduction of a background image, the replacement of a background image and entering into a background image gallery.

In the 'Modify Settings' menu, each item can be modified or set by a long touch input or by a multi-touch input and then a drag input. For example, referring to FIG. 13(b), if a drag input 665 is detected immediately after the second touch input 663, an item designated by both the second touch input 663 and the drag input 665 may be modified or the modification of settings information may be completed.

(Embodiments Related to Camera Function)

Figure 14:
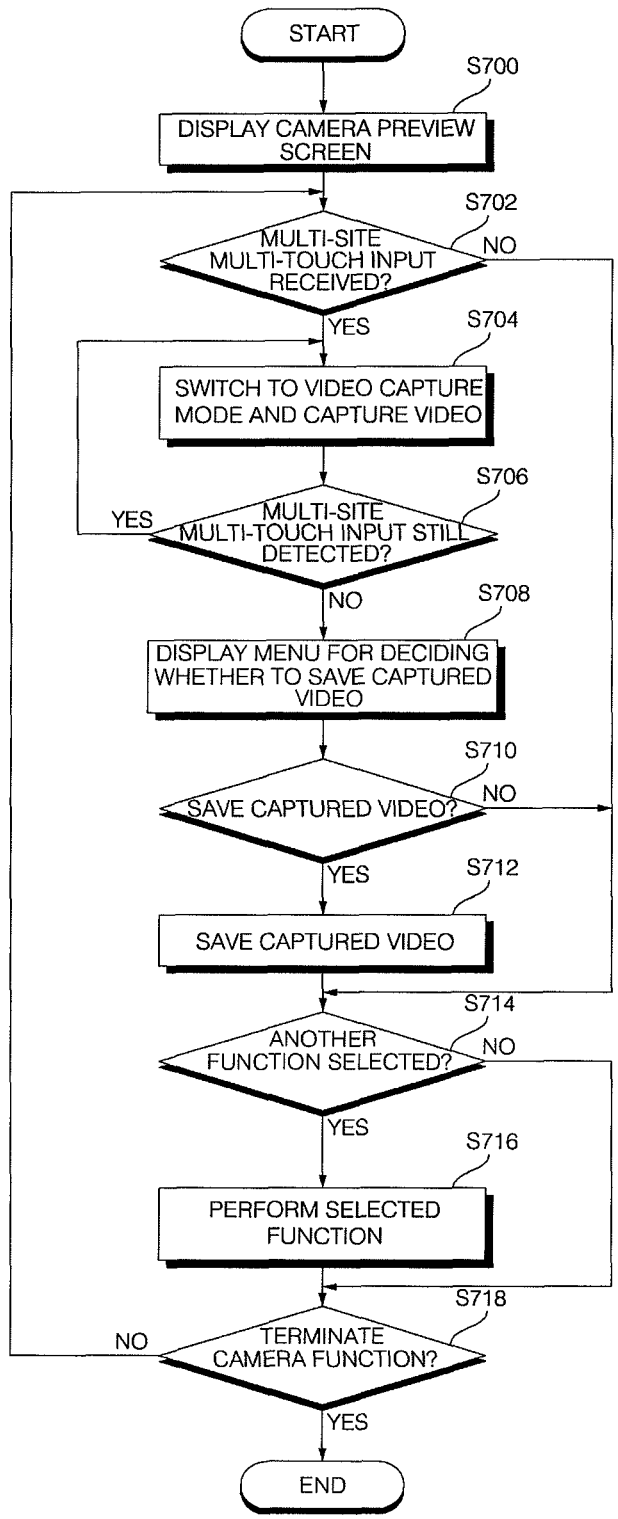
FIG. 14 illustrates a flowchart of a method of controlling the operation of a mobile terminal according to another embodiment of the present invention.

FIG. 14 illustrates a flowchart of a method of controlling the operation of a mobile terminal according to another embodiment of the present invention. Referring to FIG. 14, if a camera mode is selected in response to, for example, a user command addition, the controller 180 may display a preview screen showing a preview image provided by the camera module 121 on the display module 151 (S700).

Thereafter, if a multi-site multi-touch input is detected from the preview screen (S702), the controller 180 may switch the camera module 121 from a photo capture mode to a video recording mode and may control the camera module 121 to record a video (S704) until the multi-site multi-touch input is no longer detected from the preview screen (S706).

If the multi-site multi-touch input is no longer detected from the preview screen (S706), the controller 180 may display a menu for allowing the user to choose whether to save the recorded video on the display module 151 (S708). If the user chooses to save the recorded video (S710), the controller 180 may save the recorded video in the memory 160 as a file with a given name (S712).

If a single-site multi-touch input is detected from the preview screen, the preview image may be zoomed in or out, or a predefined function may be performed.

If a camera function other than capturing a video is selected from the preview screen (S714), the controller 180 may control the selected camera function to be performed (S716).

Operations S702 through S716 may be repeatedly performed until the user chooses to terminate the camera mode (S718).

According to this embodiment, it is possible to readily record a video in response to a multi-touch input detected from a preview screen.

Figure 15:
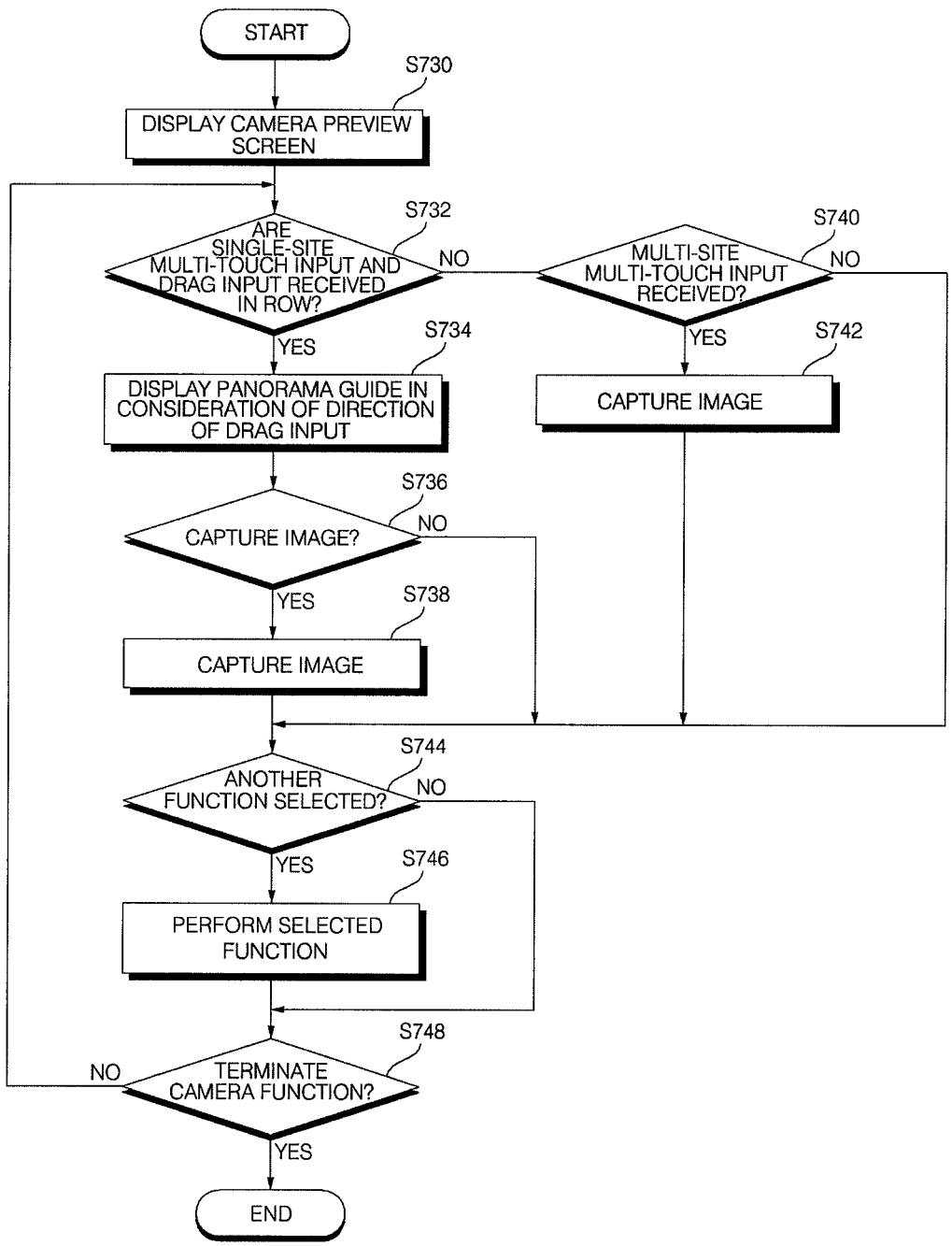
FIG. 15 illustrates a flowchart of a method of controlling the operation of a mobile terminal according to another embodiment of the present invention.

FIG. 15 illustrates a flowchart of a method of controlling the operation of a mobile terminal according to another embodiment of the present invention. Referring to FIG. 15, if a camera mode is selected in response to, for example, a user command addition, the controller 180 may display a preview screen showing a preview image provided by the camera module 121 on the display module 151 (S730).

Thereafter, if a single-site multi-touch input and then a drag input are detected in a row from the preview screen (S732), the controller 180 may display a panorama guide corresponding to the direction of the drag input (S734). For example, if a single-site multi-touch input and then a left-to-right drag are detected in a row from the preview screen, the controller 180 may display a left-to-right panorama guide. On the other hand, if a single-site multi-touch input and then a right-to-left drag are detected in a row from the preview screen, the controller 180 may display a right-to-left panorama guide.

A panorama mode is a mode for taking three or more pictures of the same place, stitching the three or more pictures into a panorama image and saving the panorama image. For this, a lattice guide may be displayed over the preview image. The lattice guide may also be useful for capturing a photo, capturing a plurality of photos in a row or capturing a self-portrait. In order to properly stitch a current image with a previous image in the panorama mode, the previous image may be partially displayed, instead of the panorama guide. In the panorama mode, not only landscape images but also portrait images can be stitched together.

Thereafter, if the user chooses to capture an image (S736), the controller 180 may control the camera module 121 to capture an image (S738). The captured image may be displayed on the display module 151, instead of the preview screen.

On the other hand, if a multi-site multi-touch input is detected from the preview screen (S740), the controller 180 may determine that the user has chosen to capture an image, and may control the camera module 121 to capture an image (S742). That is, the controller 180 may interpret a multi-site multi-touch input detected from the preview screen as a command to capture an image.

If a camera function other than capturing an image is selected (S744), the controller 180 may control the selected camera function to be performed (S746). For example, if the user multi-touches an image listed in a camera album with two fingers and then drags the image with one of the two fingers, the image may be zoomed in or out according to the distance by which it is dragged.

Operations S732 through S746 may be repeatedly performed until the user chooses to terminate the camera mode (S748).

According to this embodiment, it is possible to display a panorama guide over a preview image or capture an image in response to a multi-touch input detected from the preview image.

The embodiments of FIGS. 14 and 15 will hereinafter be described in further detail with reference to FIGS. 16 and 17.

Figure 16:
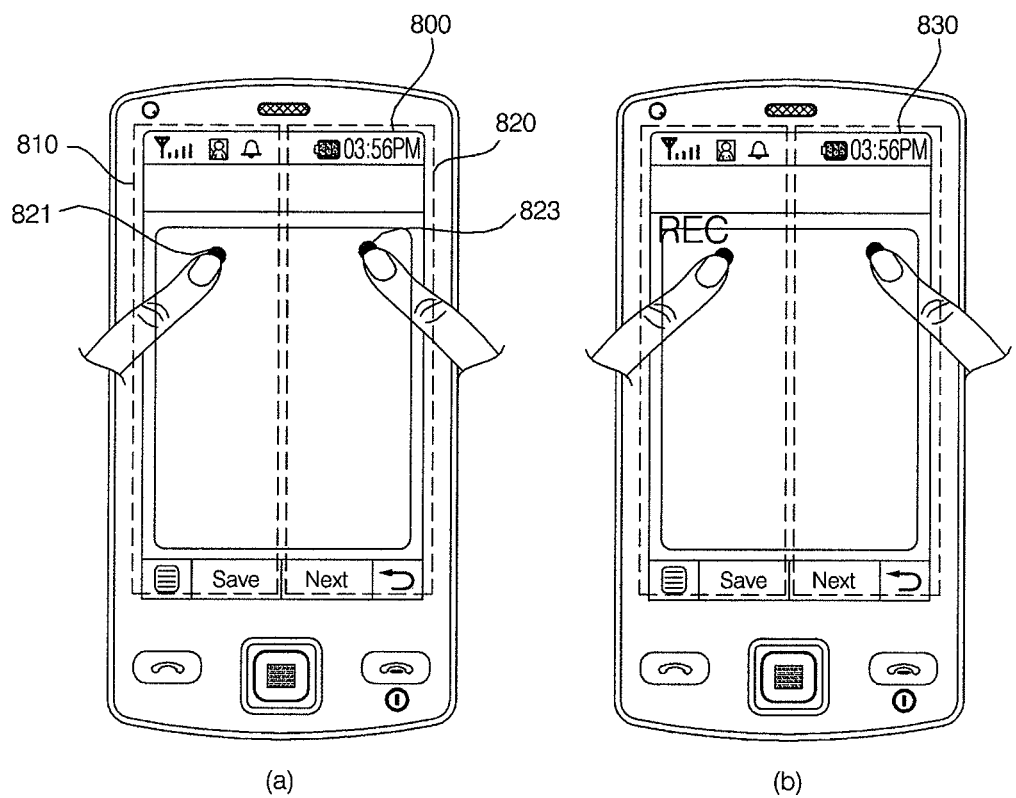
FIGS. 16 and 17 illustrate diagrams of various display screens for explaining the embodiments of FIGS. 14 and 15.

FIG. 16 illustrates how to record a video in response to a multi-site multi-touch input. Referring to FIGS. 16(*a*) and 16(*b*), if a multi-site multi-touch input, which includes first and second touch inputs 821 and 823 detected from first and second sub-screens 810 and 820, respectively, of a preview screen 800, is detected from the preview screen 800, the camera module 121 may be switched to a video recording mode, and thus, a video recording screen 830 may be displayed on the display module 151. Then, a video recording process may be performed until the multi-site multi-touch input is no longer detected. More specifically, the video recording process may be terminated when the multi-site multi-touch input is no longer detected or when another touch input is detected.

When the video recording process is terminated, a menu for allowing the user to choose whether to save the recorded video or cancel saving the recorded video or to perform an additional video recording process and save an additionally recorded video in connection with a previously recorded video may be displayed on the display module 151. If the user chooses to perform an additional video recording process and save an additionally recorded video in connection with a previously recorded video, the controller 180 may properly stitch the previously recorded video and the additionally recorded video together.

Figure 17:
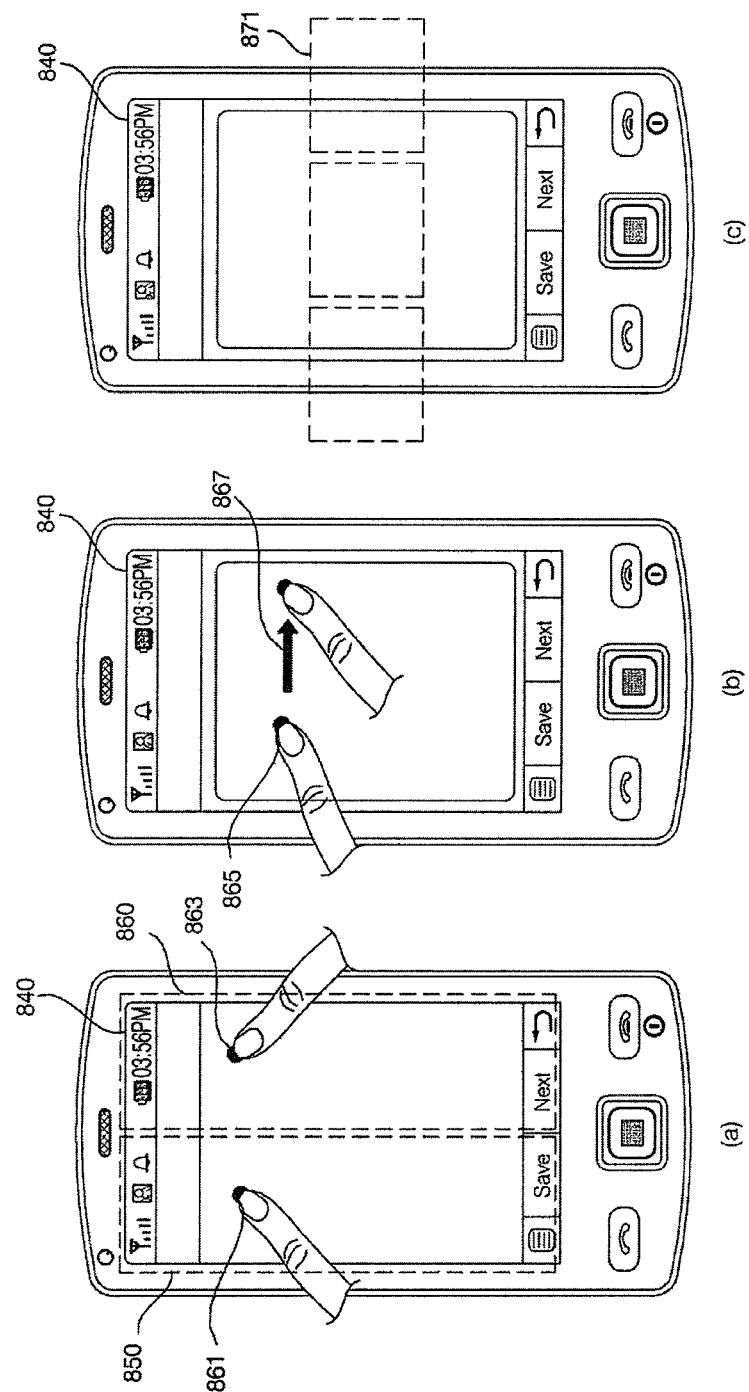

FIG. 17(*a*) illustrates how to capture an image in response to a multi-site multi-touch input. Referring to FIG. 17(*a*), if a multi-site multi-touch input, which includes first and second touch inputs 861 and 863 detected from first and second sub-screens 850 and 860, respectively, of a preview screen 840, is detected from the preview screen 840, an image capture process may be performed.

FIGS. 17(*b*) and 17(*c*) illustrate how to provide a panorama guide in response to a single-site multi-touch input and a drag input. Referring to FIGS. 17(*b*) and 17(*c*), if a single-site multi-touch input 865 and then a left-to-right drag input 867 are detected in a row from the preview screen 840, a left-to-right panorama guide 871 may be displayed on the display module 151. On the other hand, if a single-site multi-touch input and then a right-to-left drag input are detected in a row from the preview screen 840, a right-to-left panorama guide may be displayed on the display module 151.

In short, referring to FIGS. 16 and 17, it is possible to effectively control various camera operations in response to a multi-touch input detected from a preview screen.

(Embodiments Related to Multitasking)

Figure 18:
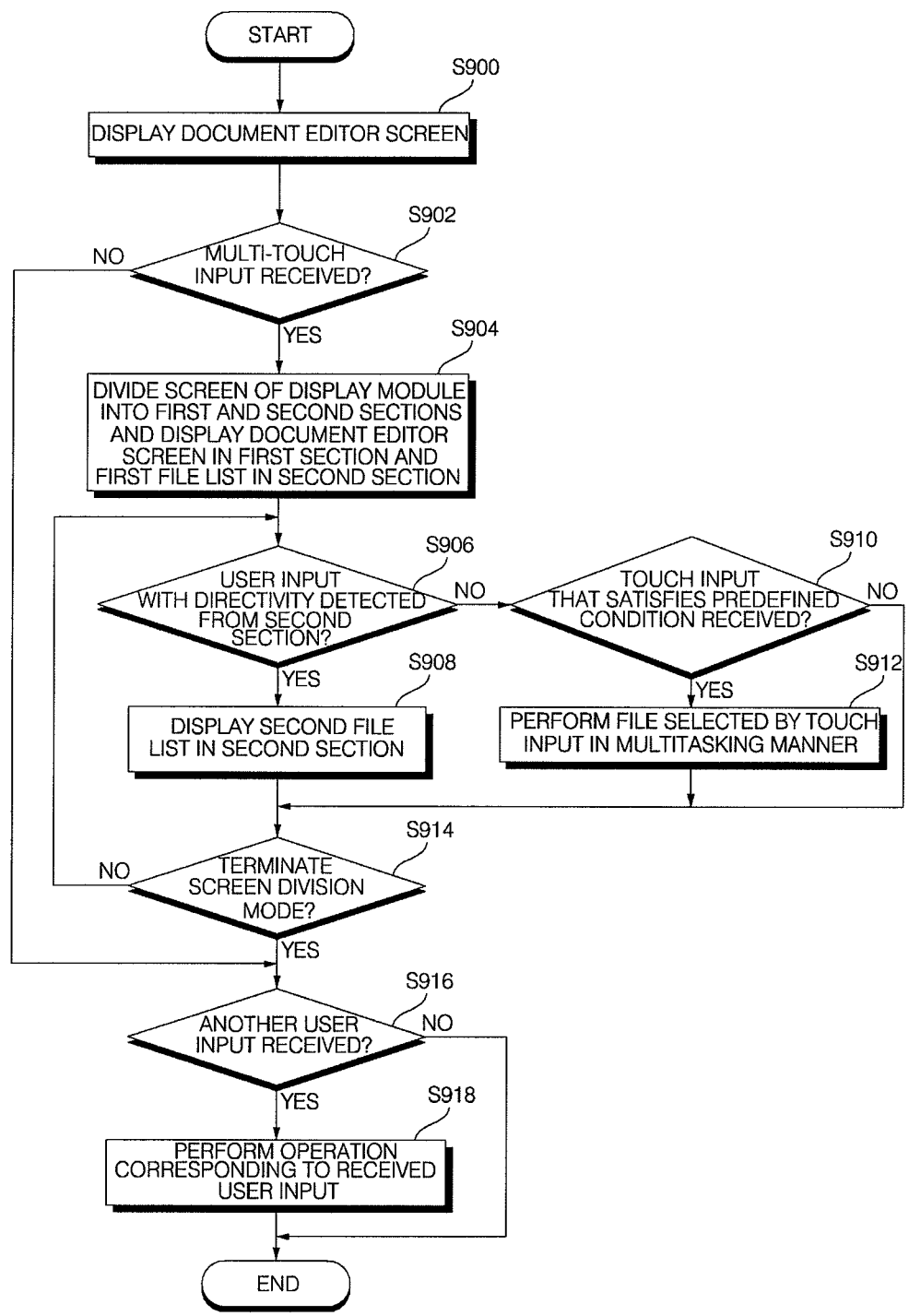
FIG. 18 illustrates a flowchart of a method of controlling the operation of a mobile terminal according to another embodiment of the present invention.

FIG. 18 illustrates a flowchart of a method of controlling the operation of a mobile terminal according to another embodiment of the present invention. Referring to FIG. 18, if an operation menu such as 'New Message' is selected in response to, for example, a user command, the controller 180 may display a document editor screen, which enables the user to create a new message or document, on the display module 151 (S900).

Thereafter, if a multi-site multi-touch input or a single-site multi-touch input is detected from the document editor screen (S902), the controller 180 may enter a screen division mode and may thus divide the screen of the display module 151 vertically into first and second sections, may display the document editor screen on the first section, and may display a display screen showing a first set of files that can be attached to any document in the document editor screen on the second section (S904).

The files displayed on the second section can be identified by their file names or icons.

Thereafter, if a user input with directivity such as a flick input or a touch-and-drag input is detected from the second section (S906), the controller 180 may either attach one of the files displayed on the second section to the document in the document editor window or display a second set of files, which is different from the first set of files, on the second section (S908).

For example, if one of the files displayed on the second section is touched and then flicked or dragged to the left, the corresponding file may be attached to the document in the document editor window. If a left-to-right flick is detected from the second section, a set of files, which is different from the first set of files, may be displayed on the second section. The term 'flick input' indicates, but is not restricted to, a user input generated by scratching the surface of the display module 151 lightly with a finger. A flick input and a typical touch input can be distinguished from each other by the duration for which the user touches the surface of the display module 151 with a finger.

Thereafter, if a touch input that satisfies a predefined condition is detected from one of the files displayed on the second section, the controller 180 may execute the file designated by the touch input in a multitasking manner (S912). The predefined condition may specify a touch duration, touch area or touch pressure that should be met. The file designated by the touch input may be executed in the background, and an operation screen relevant to the execution of the corresponding file may be displayed on the entire second section or on part of the second section.

Operations 5906 through 5912 may be repeatedly performed until the user chooses to terminate the screen division mode (S914). More specifically, the screen division mode may be terminated in response to a multi-site multi-touch input or a single-site multi-touch input or in response to the selection of a predefined menu icon.

Thereafter, if a user input other than a touch input, such as a key input, is detected (S916), the controller 180 may control an operation corresponding to the detected user input to be performed (S918).

According to this embodiment, it is possible to easily divide the screen of the display module 151, attach a file to a document or email or perform various functions other than creating a document or email in a multitasking manner in response to a multi-touch input detected from a document editor screen.

Figure 19:
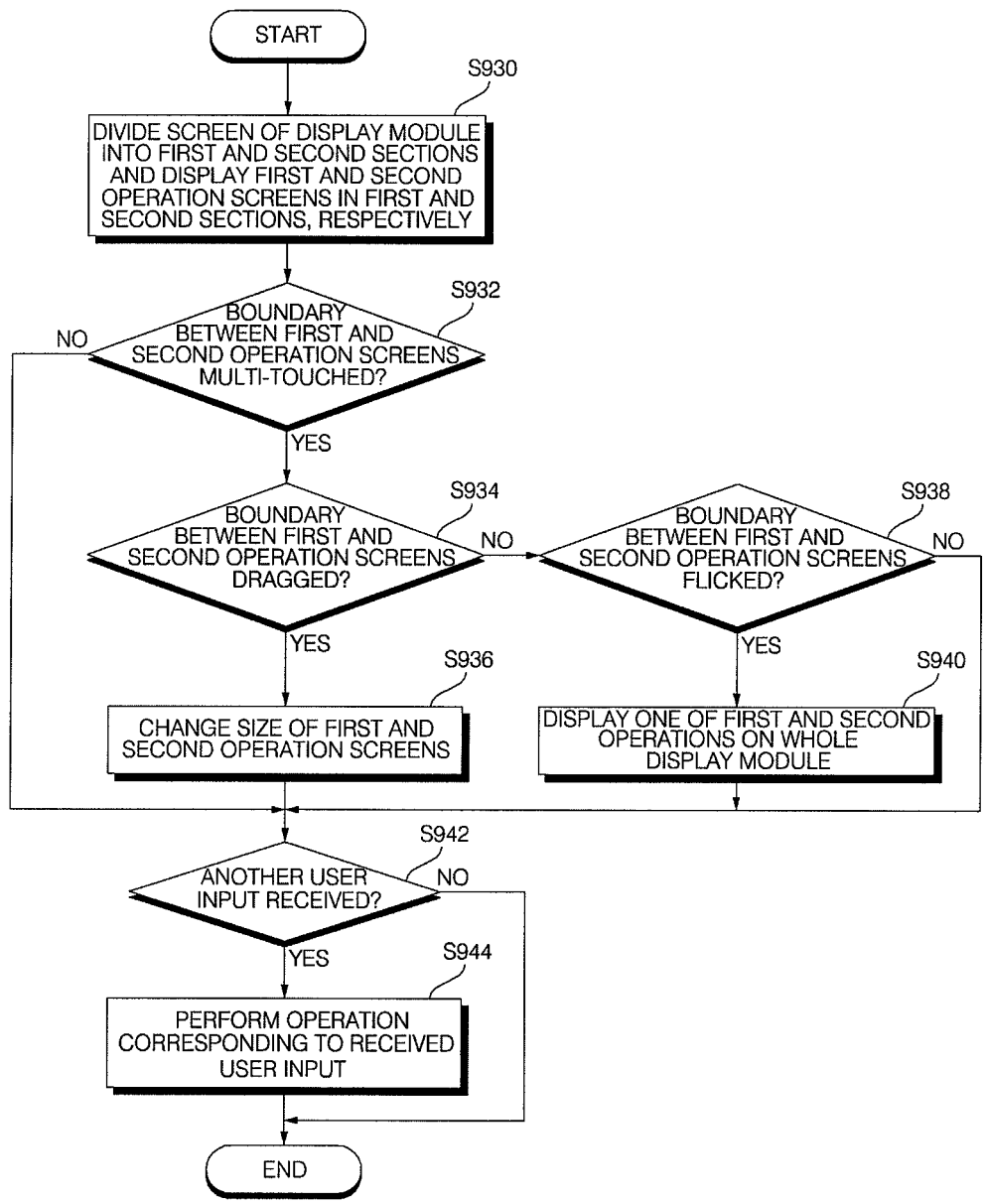
FIG. 19 illustrates a flowchart of a method of controlling the operation of a mobile terminal according to another embodiment of the present invention.

FIG. 19 illustrates a flowchart of a method of controlling the operation of a mobile terminal according to another embodiment of the present invention. Referring to FIG. 19, during multitasking, the controller 180 may divide the screen of the display module 151 vertically into first and second sections, may display a first operation screen relevant to the execution of a first function on the first section, and may display a second operation screen relevant to the execution of a second function on the second section (S930).

Thereafter, if a multi-touch input is detected from the boundary between the first and second operation screens (S932) and if a drag input is detected immediately after the multi-touch input (S934), the controller 180 may change the sizes of the first and second operation screens according to the direction and distance of the drag input (S936). For example, if the boundary between the first and second operation screens is multi-touched and then dragged to the right, the first operation screen may be enlarged by as much as the distance by which the boundary between the first and second operation screens is dragged, whereas the second operation screen may be reduced by as much as the distance by which the boundary between the first and second operation screens is dragged. On the other hand, if the boundary between the first and second operation screens is multi-touched and then dragged to the left, the second operation screen may be enlarged by as much as the distance by which the boundary between the first and second operation screens is dragged, whereas the first operation screen may be reduced by as much as the distance by which the boundary between the first and second operation screens is dragged.

On the other hand, if a multi-touch input is detected from the boundary between the first and second operation screens (S932) and if a flick input is detected immediately after the multi-touch input (S938), the controller 180 may display one of the first and second operation screens on the whole display module 151 (S940). For example, if the boundary between the first and second operation screens is multi-touched and then flicked to the left, the first operation screen may disappear, and the second operation screen may be displayed on the whole display module 151. On the other hand, if the boundary between the first and second operation screens is multi-touched and then flicked to the right, the second operation screen may disappear, and the first operation screen may be displayed on the whole display module 151.

If a user input with directivity such as a flick input or a touch-and-drag input is detected from the first section, the first operation screen may be replaced with another operation screen. Similarly, if a user input with directivity such as a flick input or a touch-and-drag input is detected from the second section, the second operation screen may be replaced with another operation screen.

If a user input, other than a multi-touch input, is detected (S942), the controller 180 may control an operation corresponding to the detected user input to be performed (S944).

According to this embodiment, it is possible to effectively change the size of each multitasking operation screen in response to a multi-touch input.

Figure 20:
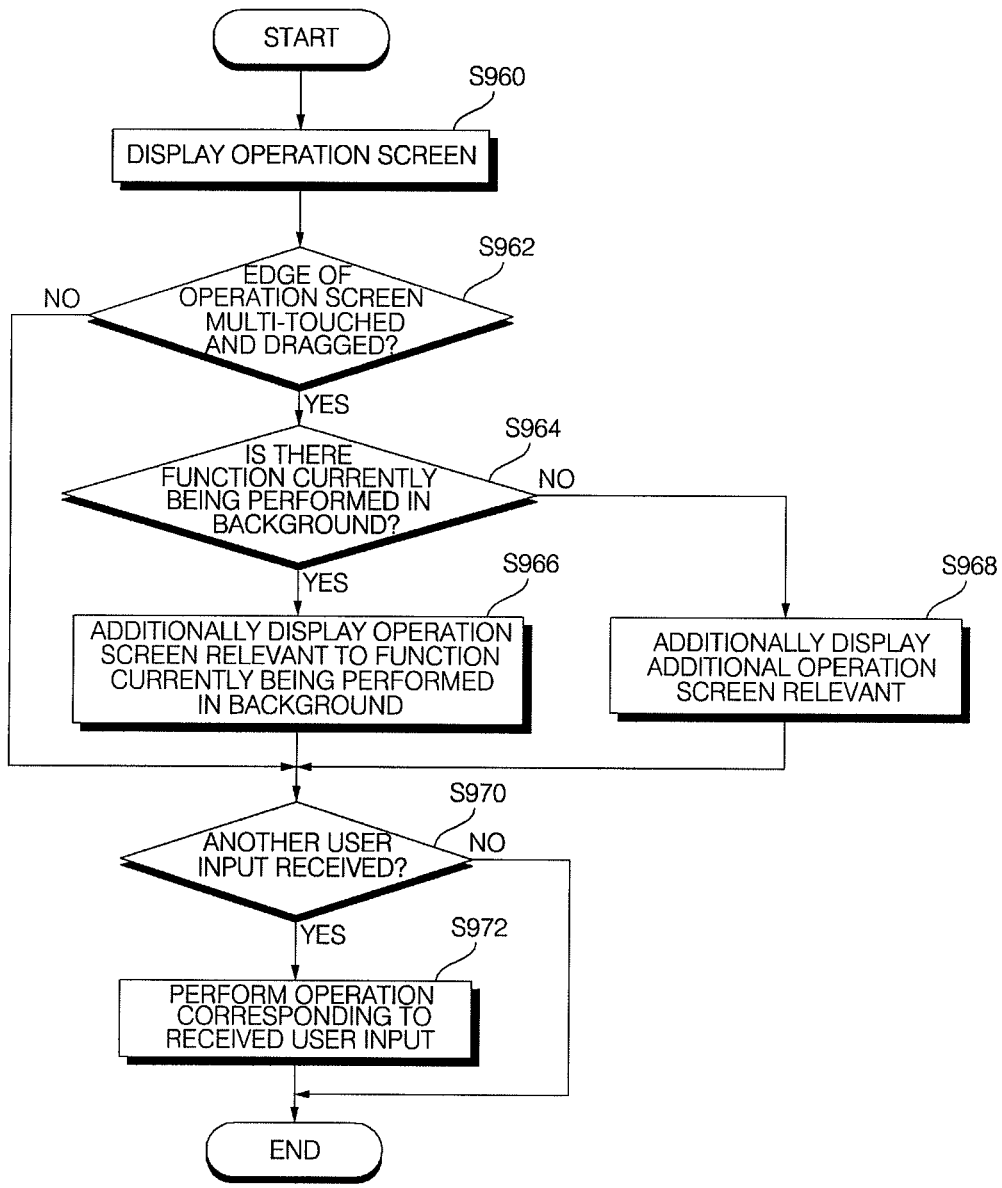
FIG. 20 illustrates a flowchart of a method of controlling the operation of a mobile terminal according to another embodiment of the present invention.

FIG. 20 illustrates a flowchart of a method of controlling the operation of a mobile terminal according to another embodiment of the present invention. Referring to FIG. 20, the controller 180 may display a current operation screen corresponding to a current operation mode on the display module 151 (S960).

Thereafter, if an edge of the current operation screen is multi-touched and then dragged (S962) and if there is a function currently being executed in the background in a multitasking manner (S964), the controller 180 may additionally display an operation screen relevant to the function currently being executed in the background on the display module 151 in a size corresponding to the distance by which the current operation screen is dragged (S966).

If there is no function currently being executed in the background, the controller 180 may additionally display an additional operation screen relevant to the current operation screen on the display module 151 in a size corresponding to the distance by which the current operation screen is dragged (S968). Examples of the additional operation screen include, but are not restricted to, a menu screen relevant to the current operation screen and a display screen for modifying settings information such as background settings information, control-related information, event information or other user settings.

The operation screen relevant to the function currently being executed in the background or the additional operation screen relevant to the current operation screen may be expanded to the place where an edge of the current operation screen is dropped. Alternatively, if the distance by which an edge of the current operation screen is dragged exceeds a predefined level, the operation screen relevant to the function currently being executed in the background or the additional operation screen relevant to the current operation screen may be displayed on half the display module 151 or on the whole display module 151.

If a user input, other than a multi-touch input, is detected (S970), the controller 180 may control an operation corresponding to the detected user input to be performed (S972).

According to this embodiment, it is possible to display an operation screen relevant to a function currently being executed in the background or an additional operation screen in response to a multi-touch input.

The embodiments of FIGS. 18 through 20 will hereinafter be described in further detail with reference to FIGS. 21 through 23.

Figure 21:
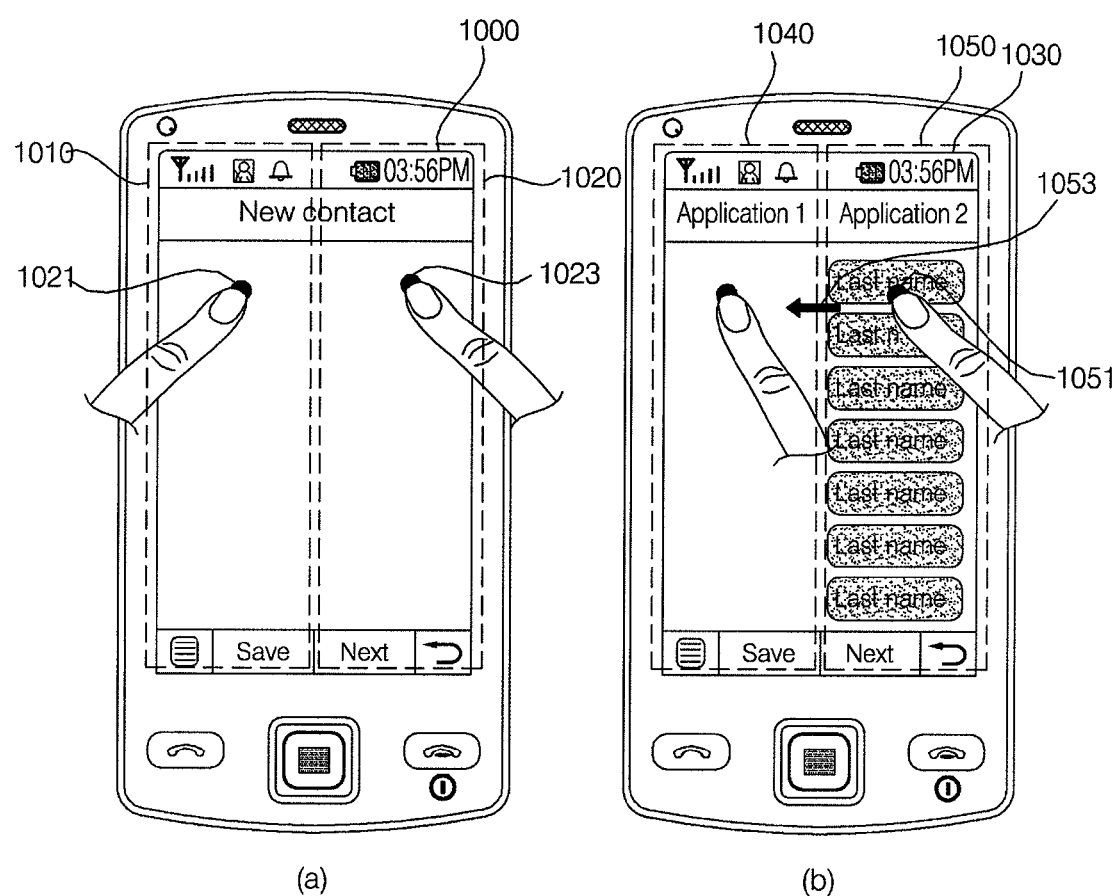
FIGS. 21 through 23 illustrate diagrams of various display screens for explaining the embodiments of FIGS. 18 through 20.

FIG. 21 illustrates how to enter a screen division mode in response to a multi-site multi-touch input. Referring to FIGS. 21(a) and 21(b), if a multi-site multi-touch input, which includes first and second touch inputs 1021 and 1023 detected from first and second sub-screens 1010 and 1020, respectively, of a document editor screen 1000, is detected from the document editor screen 1000, a display screen 1030, which is divided vertically into first and second sub-screens 1040 and 1050, may be displayed. Then, the document editor screen 1000 may be displayed in the first sub-screen 1040, and a display screen showing a first set of files that can be attached to a document, if any, in the document editor screen 1000 or can be executed may be displayed on the second sub-screen 1050.

If one of the files displayed on the second sub-screen 1050 is touched and then flicked or dragged to the left, the flicked or dragged file may be attached to the document in the document editor screen 1000.

If the second sub-screen 1050 is flicked or dragged to the right, a different set of files from the first set of files may be displayed on the second sub-screen 1050.

The type of files that can be displayed on the second sub-screen 1050 may vary according to the type of document editor screen or may be selected by the user. The screen division mode may also be entered in response to a single-site multi-touch input.

Figure 22:
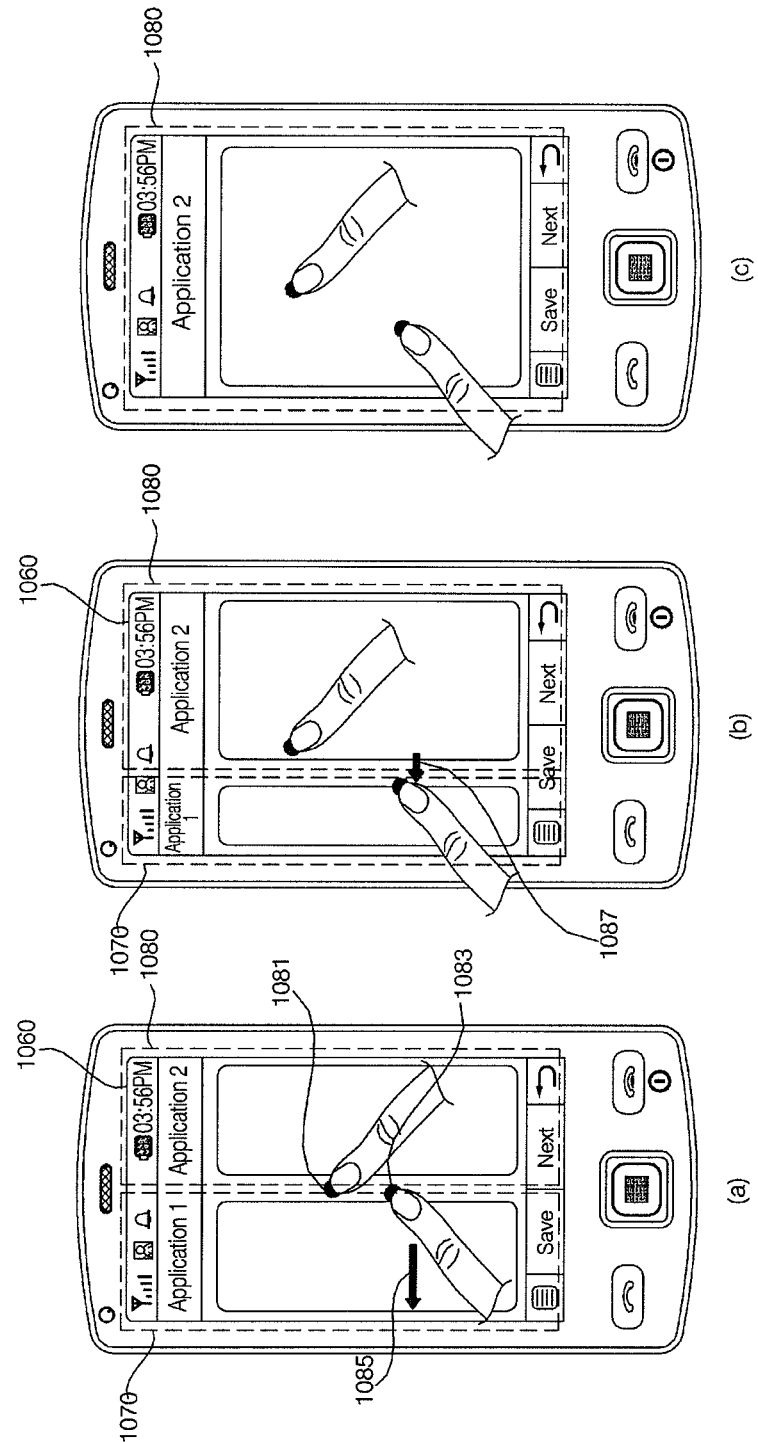

Referring to FIGS. 22(a) and 22(b), if a multi-site multi-touch input, which includes first and second touch inputs 1081 and 1083 detected from the boundary between first and second sub-screens 1070 and 1080 of a display screen 1060, and then a right-to-left drag input 1087, which begins from the point where the second touch input 1083 is detected, are detected in a row from the display screen 1060, the second sub-screen 1080 may be enlarged, whereas the first sub-screen 1070 may be reduced. Referring to FIG. 22(c), the first sub-screen 1080 may be enlarged to the full screen size of the display module 151. In short, referring to FIG. 22, it is possible to effectively change the size of each sub-screen of an operation screen in response to a multi-touch input.

Referring to FIGS. 23(a) and 23(b), if a multi-site multi-touch input, which includes first and second touch inputs 1101 and 1103 detected from an edge of an operation screen 1100, and a left-to-right drag input 1105, which begins from the point where the first touch input 1101 is detected, are detected in a row from the operation screen 1100, an additional operation screen 1110 relevant to a current operation mode may also be displayed on the display module 151. In this instance, if there is a function currently being executed in the background, an operation screen relevant to the function currently being executed in the background may be displayed on the display module 151.

Figure 23:
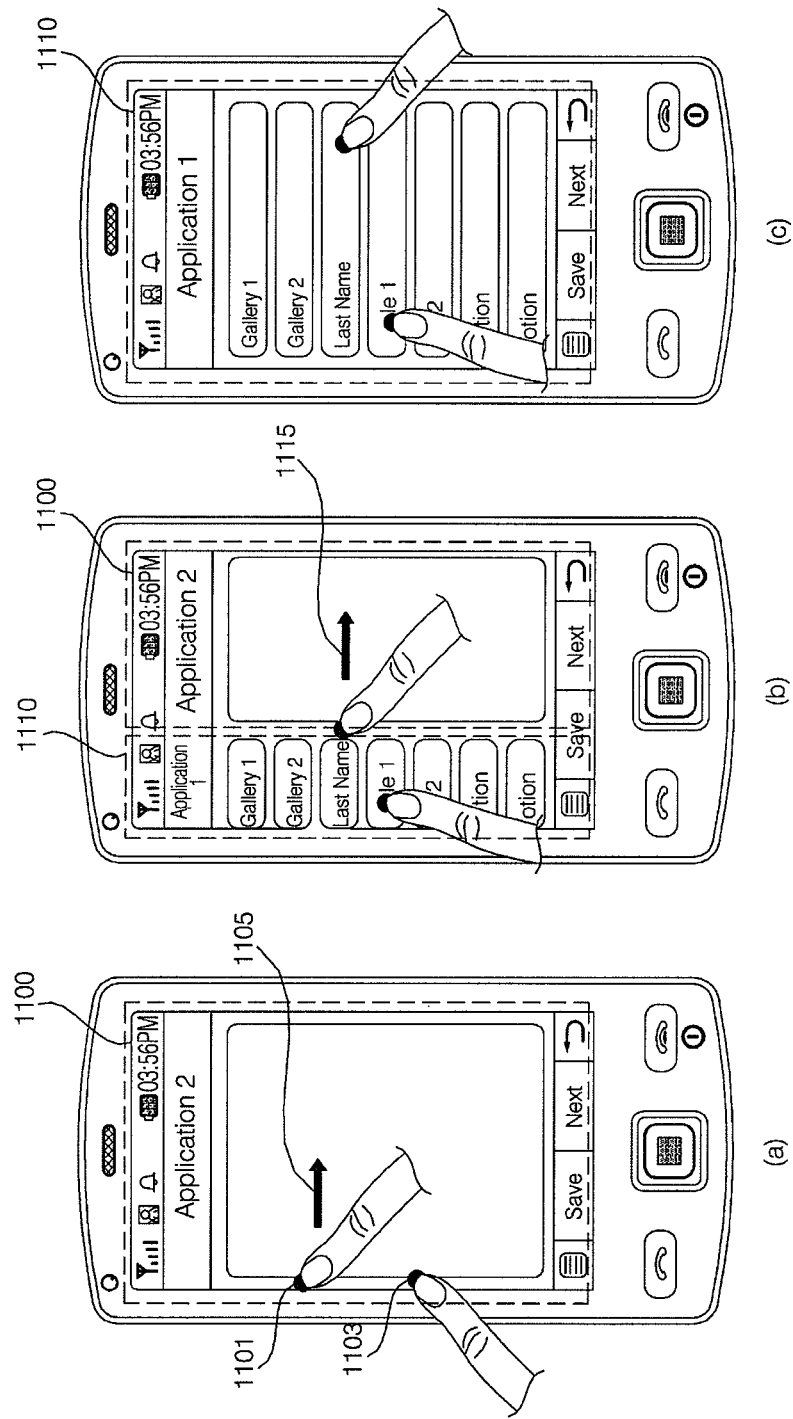

Referring to FIG. 23(c), the additional operation screen 1110 may be enlarged to the full screen size of the display module 151 in response to a drag input. In short, referring to FIG. 23, it is possible to additionally display an additional operation screen or an operation screen relevant to a function, if any, currently being executed in the background in response to a multi-touch input.

(Embodiments Related to Multimedia Player Function)

Figure 24:
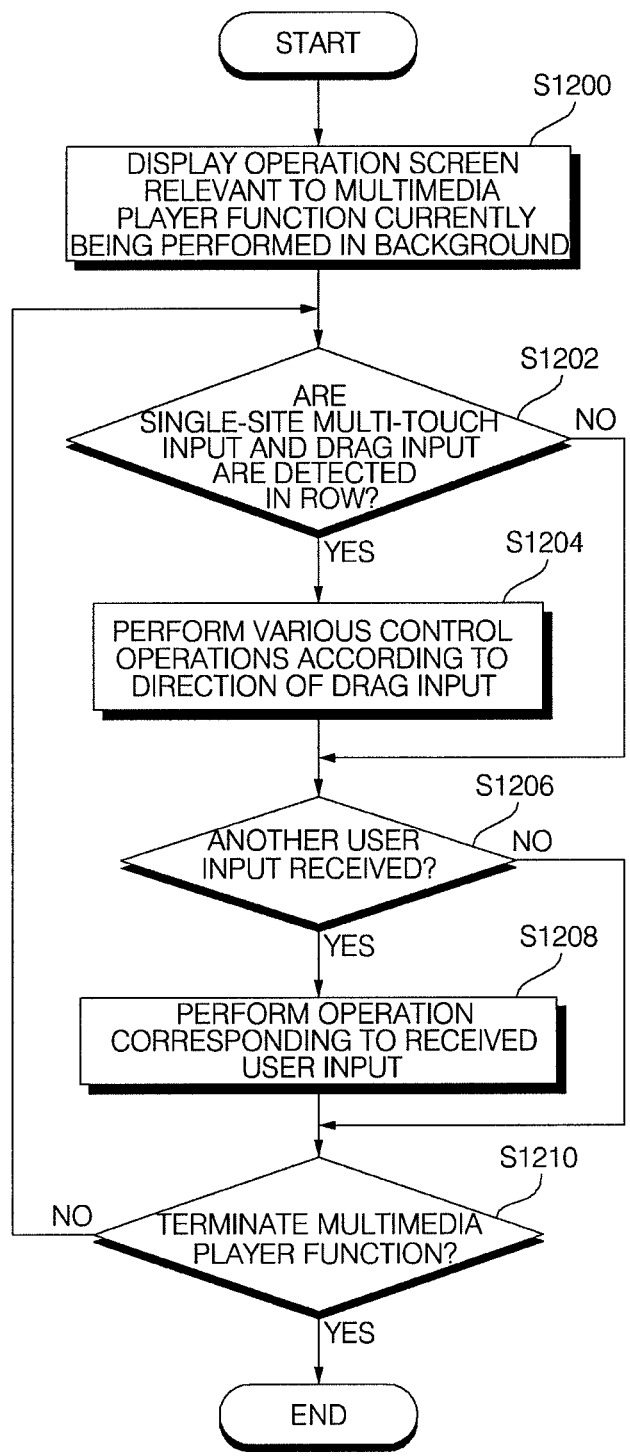
FIG. 24 illustrates a flowchart of a method of controlling the operation of a mobile terminal according to another embodiment of the present invention.

FIG. 24 illustrates a flowchart of a method of controlling the operation of a mobile terminal according to another embodiment of the present invention. Referring to FIG. 24, the controller 180 may display an operation screen relevant to a multimedia player function (such as an MP3 player function) currently being performed in the background on the display module 151 in response to, for example, a user command (S1200).

Thereafter, if a single-site multi-touch input and a drag input are detected in a row from the display module 151 (S1202), the controller 180 may perform a predefined control operation for controlling the multimedia player function according to the direction of the drag input (S1204). For example, if a single-site multi-touch input and then a left-to-right drag input are detected in a row from the display module 151, a subsequent multimedia file to a multimedia file currently being played may be played. If a single-site multi-touch input and then a left-to-right drag input are detected in a row from the display module 151, a previous multimedia file to the multimedia file currently being played may be played. If a single-site multi-touch input and then a bottom-to-top drag input are detected in a row from the display module 151, the volume of the multimedia file currently being played may be increased. If a single-site multi-touch input and then a top-to-bottom drag input are detected in a row from the display module 151, the volume of the multimedia file currently being played may be reduced.

The user may set in advance what control operation should be performed in response to a drag input that follows a single-site multi-touch input. For convenience, when a single-site multi-touch input is detected, a guide menu may be additionally provided, specifying the types of control operations that can be performed in response to a drag input that follows the single-site multi-touch input. The guide menu may be configured to automatically disappear when the single-site multi-touch input is no longer detected.

If a user input, other than a multi-touch input, is detected (S1206), the controller 180 may perform an operation corresponding to the detected user input to be performed (S1208).

Operations S1202 through S1208 may be repeatedly performed until the user chooses to terminate the whole multimedia player function (S1210).

According to this embodiment, it is possible to effectively control a multimedia player function, which is being performed in the background, in response to a multi-touch input.

This embodiment can also be applied to the control of various functions associated with TV or radio broadcast reception, the setting of a Wireless Fidelity (WiFi) or Bluetooth function or the setting of an alarm, and etc.

Figure 25:
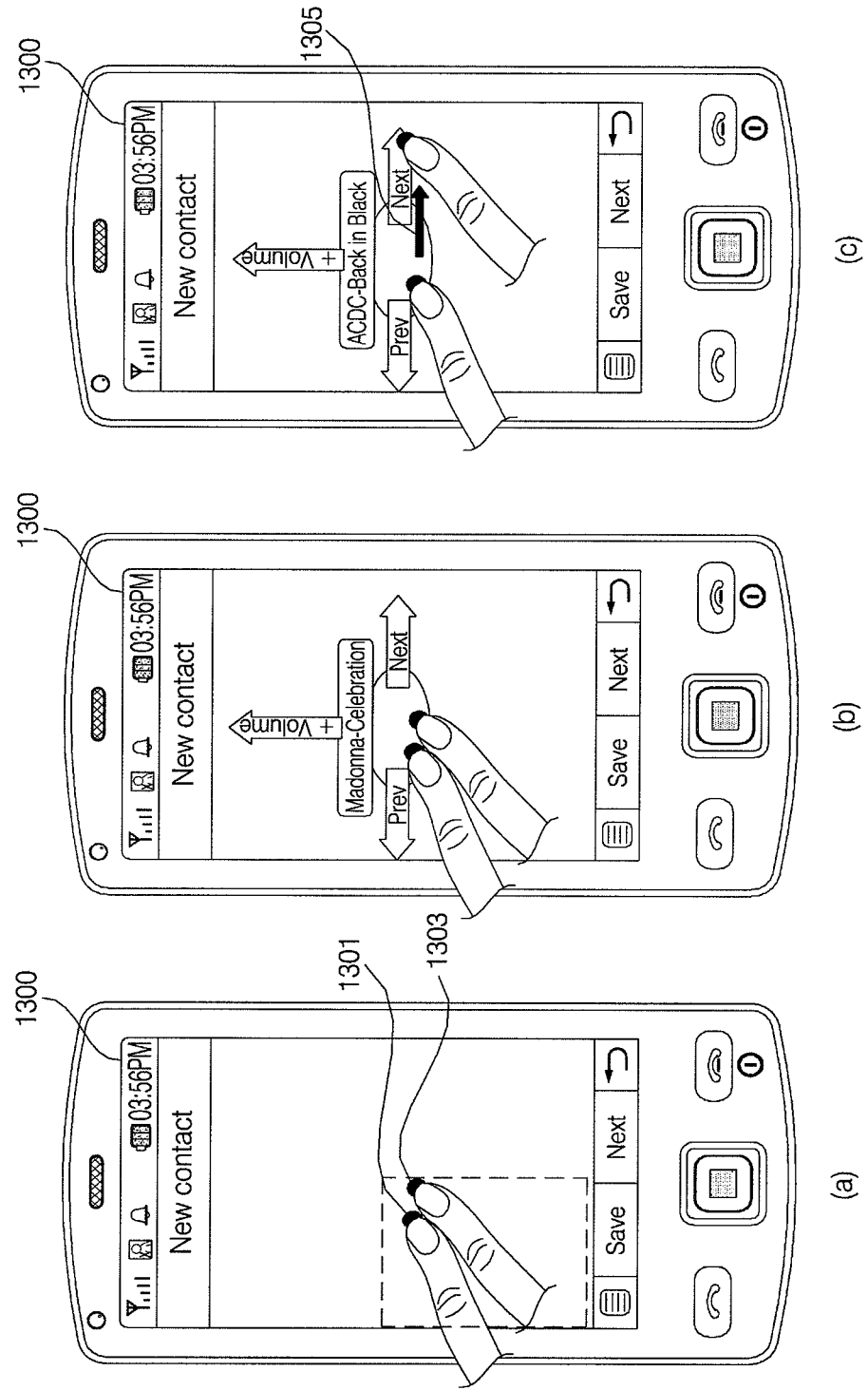
FIG. 25 illustrates diagrams of various display screens for explaining the embodiment of FIG. 24.

The embodiment of FIG. 24 will hereinafter be described in further detail with reference to FIG. 25. FIG. 25 illustrates how to control a multimedia player function in response to a multi-touch input. Referring to FIGS. 25(a) and 25(b), if a single-site multi-touch input including first and second touch inputs 1301 and 1303 is detected from one region on an operation screen 1300 relevant to a multimedia player function currently being executed in the background, a guide menu specifying various control operations that can be performed in connection with the multimedia player function in response to drag inputs with different directions may be displayed. Thus, the user can easily determine in what direction to drag across the operation screen 1300 in order to perform a desired control operation for controlling the multimedia player function. The guide menu may be displayed semi-transparently over the operation screen 1300.

Referring to FIG. 25(c), if a left-to-right drag input 1305 that begins from the point where the second touch input 1303 is detected is detected, information on a subsequent music file to that currently being played may be displayed, and the subsequent music file may be played.

In short, referring to FIG. 25, it is possible to control various operations associated with a multimedia player function in response to a multi-touch input when the multimedia player function is being performed in the background.

(Embodiment Related to Messaging)

Figure 26:
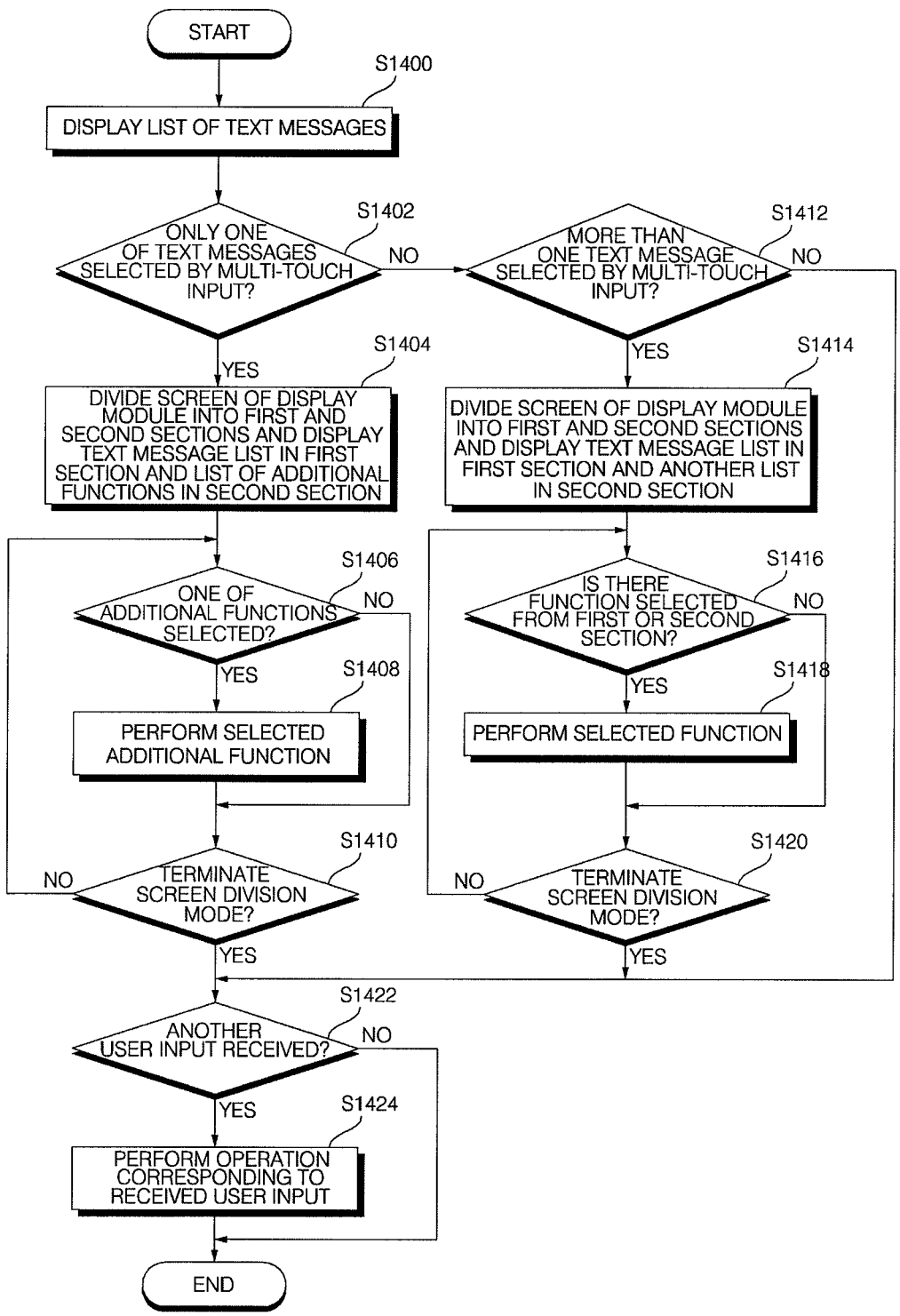
FIG. 26 illustrates a flowchart of a method of controlling the operation of a mobile terminal according to another embodiment of the present invention.

FIG. 26 illustrates a flowchart of a method of controlling the operation of a mobile terminal according to another embodiment of the present invention. Referring to FIG. 26, the controller 180 may display a first list screen showing a list of items (for example, a list of text messages) on the display module 151 in response to, for example, a user command (S1400).

Thereafter, if one of the text messages displayed on the first list screen is multi-touched (S1402), the controller 180 may enter a screen division mode, may divide the screen of the display module 151 vertically into first and second sections, may display the first list screen on the first section, and may display a display screen showing one or more additional functions that can be performed on the multi-touched text message on the second section (S1404). Examples of the additional functions include, but are not restricted to, replying to the multi-touched text message, saving the multi-touched text message, saving an image, if any, attached to the multi-touched text message, saving the phone number from which the multi-touched text message was sent, copying the multi-touched text message, viewing the content of the multi-touched text message or a file, if any, attached to the multi-touched text message, displaying information on the sender of the multi-touched text message, and displaying the content of a previous text message to the multi-touched text message and the content of a reply to the multi-touched text message.

Thereafter, if one of the additional functions is selected (S1406), the controller 180 may control the selected additional function to be performed (S1408).

Operations S1406 and S1408 may be repeatedly performed until the user chooses to terminate the screen division mode (S1410). The screen division mode may be terminated in response to a single-site multi-touch input or in response to the selection of a predetermined menu icon.

If more than one item on the first list screen is multi-touched (S1412), the controller 180 may enter the screen division mode, may divide the screen of the display module 151 vertically into first and second sections, may display the first list screen on the first section, and may display a second list screen on the second section (S1414). If the first list screen is a list screen showing a list of short message service (SMS) messages, the second list screen may be a list screen showing a list of multimedia messaging service (MMS) messages.

Thereafter, if there is a function selected from one of the first and second list screens (S1416), the controller 180 may control the selected function to be performed (S1418).

Operations S1416 and S1418 may be repeatedly performed until the user chooses to terminate the screen division mode (S1420).

If a user input, other than a multi-touch input, is detected (S1422), the controller 180 may control an operation corresponding to the detected user input to be performed (S1424).

According to this embodiment, it is possible to control various operations that can be performed in connection with a list of text messages in response to a multi-touch input.

Figure 27:
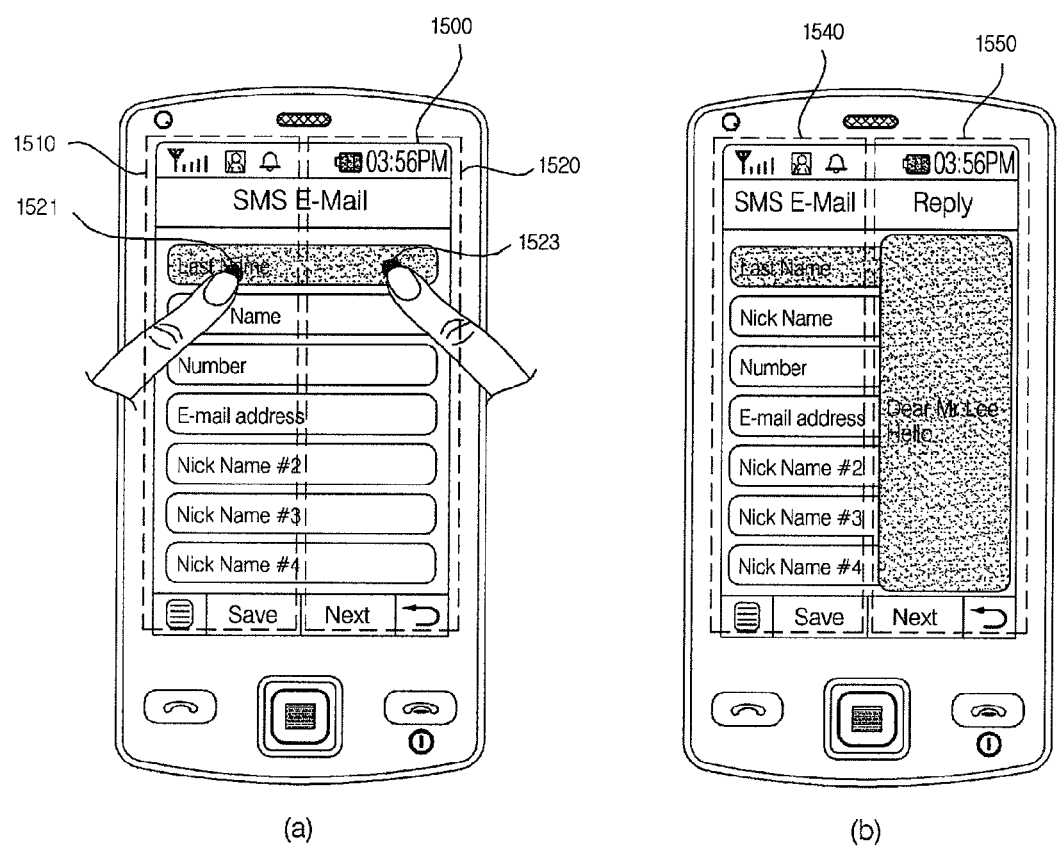
FIG. 27 illustrates diagrams of various display screens for explaining the embodiment of FIG. 26.

The embodiment of FIG. 26 will hereinafter be described in further detail with reference to FIG. 27.

Referring to FIGS. 27(a) and 27(b), if one of a plurality of text messages displayed on a list screen 1500 is selected by a multi-touch input including first and second touch inputs 1521 and 1523, the screen of the display module 151 may be vertically divided into first and second sections. Then, a list screen 1540, which is the same as the list screen 1500, may be displayed on the first section, and a display screen 1550 showing a list of additional functions that can be performed on the selected text message may be displayed on the second section.

In addition, if more than one text message on the list screen 1500 is selected by a multi-touch input, the list screen 1540 may be displayed on the first section, and another list screen may be displayed on the second section. In short, referring to FIG. 27, it is possible to control various operations that can be performed in connection with a list of text messages in response to a multi-touch input.

(Embodiment Related to Unlocking and Other Embodiments)

Alternatively to the embodiments of FIGS. 6, 7, 11, 14, 15, 18 through 20, 24 and 26, the mobile terminal 100 may be configured to be temporarily released from a lock state in response to a multi-touch input in order to perform a predefined function. More specifically, if a predetermined area on the display module 151 is multi-touched, the mobile terminal 100 may be temporarily released from the lock state and may thus be able to perform a predetermined function. Once the mobile terminal 100 finishes performing the predetermined function, the mobile terminal 100 may be automatically placed back in the lock state. Examples of the predetermined function that can be performed by temporarily releasing the mobile terminal 100 from the lock state include, but are not restricted to, checking the time, viewing text messages, viewing memos, using a calculator, and using an electronic dictionary.

During an augmented reality service, if more than one icon displayed on the display module 151 is selected by a multi-touch input, information indicating the distance between the selected icons may be displayed in one area on the display module 151. Icons may be displayed differently from one another according to the distance of what they represent from the user. For example, the size of an icon representing an object or entity in the close vicinity of the user may be greater than the size of an icon representing an object or entity less close to the user. In addition, an icon representing an object or entity in the close vicinity of the user may be displayed in a darker color than an icon representing an object or entity less close to the user. This type of method of displaying the distance of objects or entities from the user using the size or color of icons can be applied to only a number of icons selected by the user or to all icons displayed on the display module 151.

The mobile terminal according to the present invention and the method of controlling the operation of the mobile terminal according to the present invention are not restricted to the embodiments set forth herein. Therefore, variations and combinations of the embodiments set forth herein may fall within the scope of the present invention.

The present invention can be realized as code that can be read by a processor included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to control various operations performed by a mobile terminal using a multi-site multi-touch input and a single-site multi-touch input. In addition, it is possible to facilitate the manipulation of a mobile terminal by using a multi-site multi-touch input and/or a single-site multi-touch input together with a typical key input or a typical touch input.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
   allowing, via a wireless communication unit of the mobile terminal, wireless communication with at least one other terminal;
   displaying, via a touch screen display unit of the mobile terminal, an idle screen having predefined first and second display portions in which a multi-touch input simultaneously in both the first and second display portions is defined as a multi-site multi-touch input and a multi-touch input simultaneously only in one of the first and second predefined display portions is defined as a single-site multi-touch input, the predefined first and second display portions being left and right halves of the touch screen display unit;
   receiving, via a controller of the mobile terminal, the multi-site multi-touch input in both of the first and second display portions;
   executing, via the controller, a first function based on the received multi-site multi-touch input, said first function displaying a first menu screen that includes a plurality of applications executable on the mobile terminal;
   receiving, via the controller, the single-site multi-touch input; and
   executing, via the controller, a second function different from the first function based on the received single-site multi-touch input.

2. The method of claim 1, wherein executing the first function further comprises:
   receiving, via the controller, another touch input that satisfies a predefined condition in at least one of the first and second display portions, the predefined condition being set regarding a touch duration or touch area; and
   in response to the another touch input, displaying a second menu screen that includes a plurality of different applications executable on the mobile terminal.

3. The method of claim 1, wherein the second function includes displaying a modify settings menu screen.

4. The method of claim 3, wherein the modify settings menu screen includes menus for modifying at least one of background setting information, control-related information, event-related information and user setting information of the mobile terminal.

5. The method of claim 4, further comprising:
   receiving another touch input on one of the menus included in the modify settings menu screen; and
   providing options for modifying the information for said one of the touched menus.

6. The method of claim 5, wherein the single-site multi-touch input includes a second touch input on said one of the menus, and
   wherein the method further comprises receiving a touch-and-drag action from said one of the menus displayed in the first display portion to the second display portion and modifying the information for said one of the touched menus based on the touch-and-drag action.

7. The method of claim 1, wherein the first menu screen includes home applications that can be executed on the mobile terminal and the second function includes displaying an environment settings menu for assigning different settings on the mobile terminal.

8. The method of claim 1, wherein the first menu screen includes a plurality of application icons respectively corresponding to the plurality of applications executable on the mobile terminal.

9. The method of claim 8, further comprising:
   receiving a first selection signal indicating a selection of a first application icon among the plurality of application icons; and
   executing the application corresponding to the selected first application icon.

10. The method of claim 9, further comprising:
    receiving a second selection signal indicating a selection of a second application icon among the plurality of application icons after the first application icon is selected; and
    executing the application corresponding to the selected second application icon after the application corresponding to the first application icon is executed.

11. The method of claim 2, further comprising:
    providing a menu for setting at least one of the first and second menu screens.

12. A mobile terminal, comprising:
    a wireless communication unit configured to allow wireless communication with at least one other terminal;
    a touch screen display unit configured to display an idle screen having predefined first and second display portions in which a multi-touch input simultaneously in both the first and second display portions is defined as a multi-site multi-touch input and a multi-touch input simultaneously only in one of the first and second predefined display portions is defined as a single-site multi-touch input, the predefined first and second display portions being left and right halves of the touch screen display unit; and a controller configured to:

receive the multi-site multi-touch input in both of the first and second display portions, execute a first function based on the received multi-site multi-touch input, said first function displaying a first menu screen that includes a plurality of applications executable on the mobile terminal, receive the single-site multi-touch input, and execute a second function different from the first function based on the received single-site multi-touch input.

13. The mobile terminal of claim 12, wherein the controller is further configured to receive another touch input that satisfies a predefined condition in at least one of the first and second display portions, the predefined condition being set regarding a touch duration or touch area, and in response to the another touch input, to display a second menu screen that includes a plurality of different applications executable on the mobile terminal.

14. The mobile terminal of claim 12, wherein the second function includes displaying a modify settings menu screen.

15. The mobile terminal of claim 14, wherein the modify settings menu screen includes menus for modifying at least one of background setting information, control-related information, event-related information and user setting information of the mobile terminal.

16. The mobile terminal of claim 15, wherein the controller is further configured to receive another touch input on one of the menus included in the modify settings menu screen, and provide options for modifying the information for said one of the touched menus.

17. The mobile terminal of claim 16, wherein the single-site multi-touch input includes a second touch input on said one of the menus, and wherein the controller is further configured to receive a touch-and-drag action from said one of the menus displayed in the first display portion to the second display portion and modify the information for said one of the touched menus based on the touch-and-drag action.

18. The mobile terminal of claim 12, wherein the first menu screen includes home applications that can be executed on the mobile terminal and the second function includes displaying an environment settings menu for assigning different settings on the mobile terminal, under control of the controller.

19. The mobile terminal of claim 12, wherein the first menu screen includes a plurality of application icons respectively corresponding to the plurality of applications executable on the mobile terminal.

20. The mobile terminal of claim 19, wherein the controller is further configured to receive a first selection signal indicating a selection of a first application icon among the plurality of application icons, and execute the application corresponding to the selected first application icon.

21. The mobile terminal of claim 20, wherein the controller is further configured to receive a second selection signal indicating a selection of a second application icon among the plurality of application icons after the first application icon is selected, and execute the application corresponding to the selected second application icon after the application corresponding to the first application icon is executed.

22. The mobile terminal of claim 13, wherein the controller is further configured to provide a menu for setting at least one of the first and second menu screens.

* * * * *